(12) United States Patent
Ito et al.

(10) Patent No.: US 9,130,850 B2
(45) Date of Patent: Sep. 8, 2015

(54) MONITORING SYSTEM AND MONITORING PROGRAM WITH DETECTION PROBABILITY JUDGMENT FOR CONDITION EVENT

(75) Inventors: Atsushi Ito, Fujisawa (JP); Hideo Takahashi, Yokohama (JP); Takeshi Arisaka, Yokohama (JP); Takumi Tomita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 13/701,624

(22) PCT Filed: Jul. 20, 2012

(86) PCT No.: PCT/JP2012/068431
§ 371 (c)(1),
(2), (4) Date: Dec. 3, 2012

(87) PCT Pub. No.: WO2014/013603
PCT Pub. Date: Jan. 23, 2014

(65) Prior Publication Data
US 2014/0025808 A1 Jan. 23, 2014

(51) Int. Cl.
*G06F 13/00* (2006.01)
*H04L 12/26* (2006.01)
*H04L 12/24* (2006.01)

(52) U.S. Cl.
CPC .............. *H04L 43/10* (2013.01); *H04L 41/065* (2013.01); *H04L 41/16* (2013.01)

(58) Field of Classification Search
CPC ... H04L 29/08072; H04L 29/06; H04L 43/00; H04L 12/2602; H04L 41/22; H04L 43/10; H04L 41/16; H04L 41/065
USPC ........................................................ 709/224
See application file for complete search history.

(56) References Cited

U.S. PATENT DOCUMENTS

| | | |
|---|---|---|
| 7,107,185 B1 | 9/2006 | Yemini et al. |
| 2009/0300428 A1 | 12/2009 | Matsumoto et al. |
| 2009/0313198 A1 | 12/2009 | Kudo et al. |
| 2011/0209010 A1 | 8/2011 | Morimura et al. |
| 2012/0066376 A1 | 3/2012 | Nagura et al. |
| 2012/0102362 A1* | 4/2012 | Onitsuka et al. ................ 714/37 |

FOREIGN PATENT DOCUMENTS

| | | |
|---|---|---|
| JP | 2012-059063 A | 3/2012 |
| WO | WO 2012/053104 A1 | 4/2012 |

OTHER PUBLICATIONS

PCT International Search Report on application PCT/JP2012/068431 mailed Oct. 9, 2012; 2 pages.

* cited by examiner

*Primary Examiner* — Robert B Harrell
(74) *Attorney, Agent, or Firm* — Foley & Lardner LLP

(57) ABSTRACT

A monitoring system is configured to perform a cause analysis of an event which occurs in any of a plurality of node apparatuses. The monitoring system is configured to store a plurality of rules indicating a correspondence relationship between one or more condition events regarding any of the plurality of node apparatuses, and a conclusion. The monitoring system is configured to specify the first conclusion associated with the detected condition event based on the rule, and perform a detection possibility judgment on whether the monitoring system can detect the condition event or not, for each of one or more condition events out of a plurality of condition events, and calculate the first index value indicating the certainty of the first conclusion being the cause, based on the existence of detection of one or more condition events associated with the first conclusion and the result of the detection possibility judgment.

15 Claims, 22 Drawing Sheets

Fig. 4

| # | Node type | Node name | Event type | Received date and time |
|---|---|---|---|---|
| 1 | Server | VM A | Logical disc failure | 2012/4/7 10:30:22 |

Fig. 5

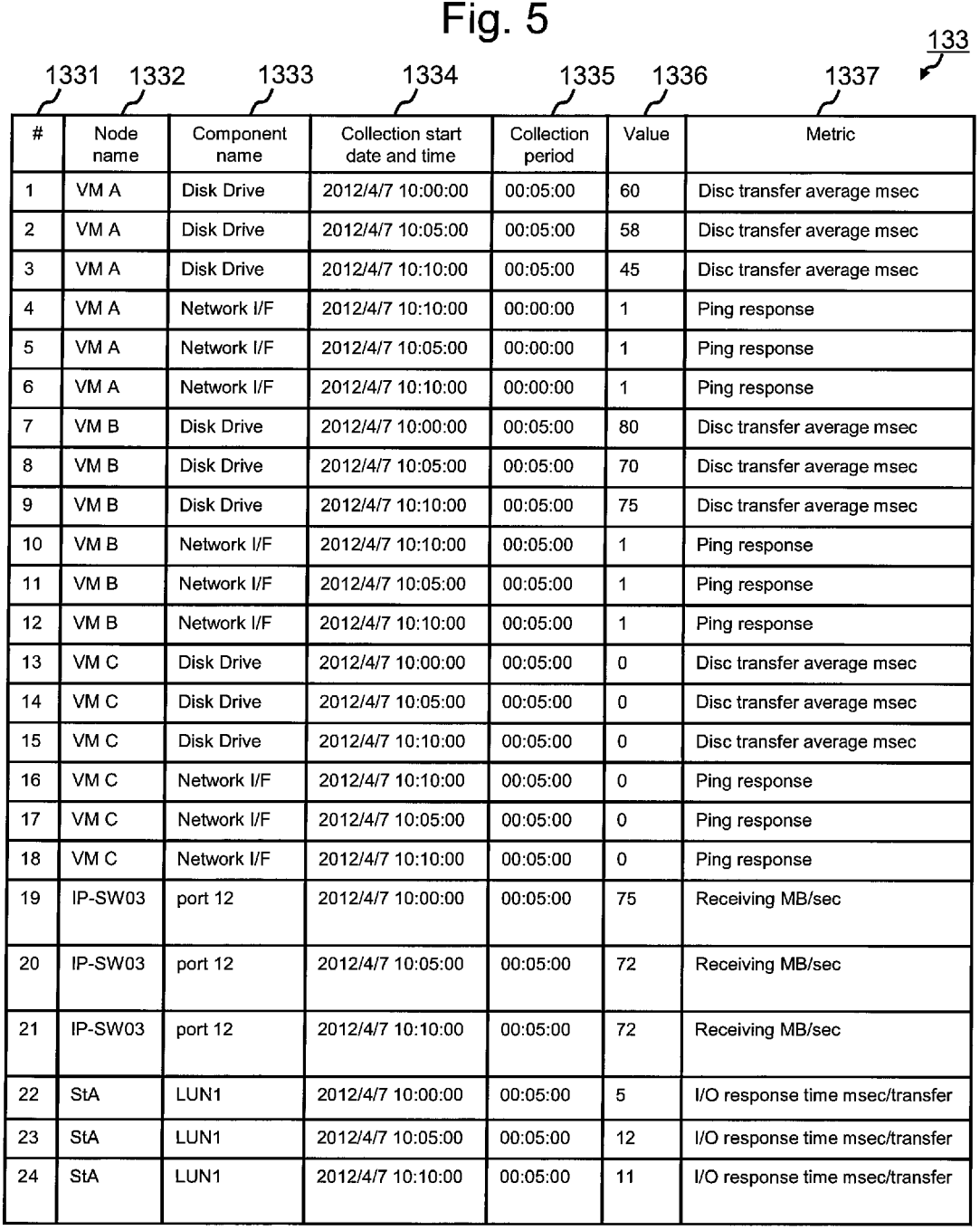

| # | Node name | Component name | Collection start date and time | Collection period | Value | Metric |
|---|---|---|---|---|---|---|
| 1 | VM A | Disk Drive | 2012/4/7 10:00:00 | 00:05:00 | 60 | Disc transfer average msec |
| 2 | VM A | Disk Drive | 2012/4/7 10:05:00 | 00:05:00 | 58 | Disc transfer average msec |
| 3 | VM A | Disk Drive | 2012/4/7 10:10:00 | 00:05:00 | 45 | Disc transfer average msec |
| 4 | VM A | Network I/F | 2012/4/7 10:10:00 | 00:00:00 | 1 | Ping response |
| 5 | VM A | Network I/F | 2012/4/7 10:05:00 | 00:00:00 | 1 | Ping response |
| 6 | VM A | Network I/F | 2012/4/7 10:10:00 | 00:00:00 | 1 | Ping response |
| 7 | VM B | Disk Drive | 2012/4/7 10:00:00 | 00:05:00 | 80 | Disc transfer average msec |
| 8 | VM B | Disk Drive | 2012/4/7 10:05:00 | 00:05:00 | 70 | Disc transfer average msec |
| 9 | VM B | Disk Drive | 2012/4/7 10:10:00 | 00:05:00 | 75 | Disc transfer average msec |
| 10 | VM B | Network I/F | 2012/4/7 10:10:00 | 00:05:00 | 1 | Ping response |
| 11 | VM B | Network I/F | 2012/4/7 10:05:00 | 00:05:00 | 1 | Ping response |
| 12 | VM B | Network I/F | 2012/4/7 10:10:00 | 00:05:00 | 1 | Ping response |
| 13 | VM C | Disk Drive | 2012/4/7 10:00:00 | 00:05:00 | 0 | Disc transfer average msec |
| 14 | VM C | Disk Drive | 2012/4/7 10:05:00 | 00:05:00 | 0 | Disc transfer average msec |
| 15 | VM C | Disk Drive | 2012/4/7 10:10:00 | 00:05:00 | 0 | Disc transfer average msec |
| 16 | VM C | Network I/F | 2012/4/7 10:10:00 | 00:05:00 | 0 | Ping response |
| 17 | VM C | Network I/F | 2012/4/7 10:05:00 | 00:05:00 | 0 | Ping response |
| 18 | VM C | Network I/F | 2012/4/7 10:10:00 | 00:05:00 | 0 | Ping response |
| 19 | IP-SW03 | port 12 | 2012/4/7 10:00:00 | 00:05:00 | 75 | Receiving MB/sec |
| 20 | IP-SW03 | port 12 | 2012/4/7 10:05:00 | 00:05:00 | 72 | Receiving MB/sec |
| 21 | IP-SW03 | port 12 | 2012/4/7 10:10:00 | 00:05:00 | 72 | Receiving MB/sec |
| 22 | StA | LUN1 | 2012/4/7 10:00:00 | 00:05:00 | 5 | I/O response time msec/transfer |
| 23 | StA | LUN1 | 2012/4/7 10:05:00 | 00:05:00 | 12 | I/O response time msec/transfer |
| 24 | StA | LUN1 | 2012/4/7 10:10:00 | 00:05:00 | 11 | I/O response time msec/transfer |

Fig. 6

Event occurrence rule repository  134

| # | Node type | Event type | Event occurrence condition ||||
|---|---|---|---|---|---|---|
| | | | Survey target | Survey period | Value | Metric |
| 1 | Server | Logical disc failure | Disk Drive | ... | Greater than 0 at least one time | Disc transfer average msec |
| 2 | Server | Logical disc failure | Network I/F | ... | Greater than 0 | Ping response |
| 3 | Switch | port Link Down | port | ... | Greater than 0 at least one time | Receiving MB/sec |
| 4 | Switch | port Link Down | port | ... | Greater than 0 at least one time | Sending MB/sec |
| 5 | Storage | Disc failure | LU | ... | Greater than 0 at least one time | I/O response time msec/transfer |

Columns: 1341, 1342, 1343, 1344a, 1344b, 1344, 1344c, 1344d; row group 1340.

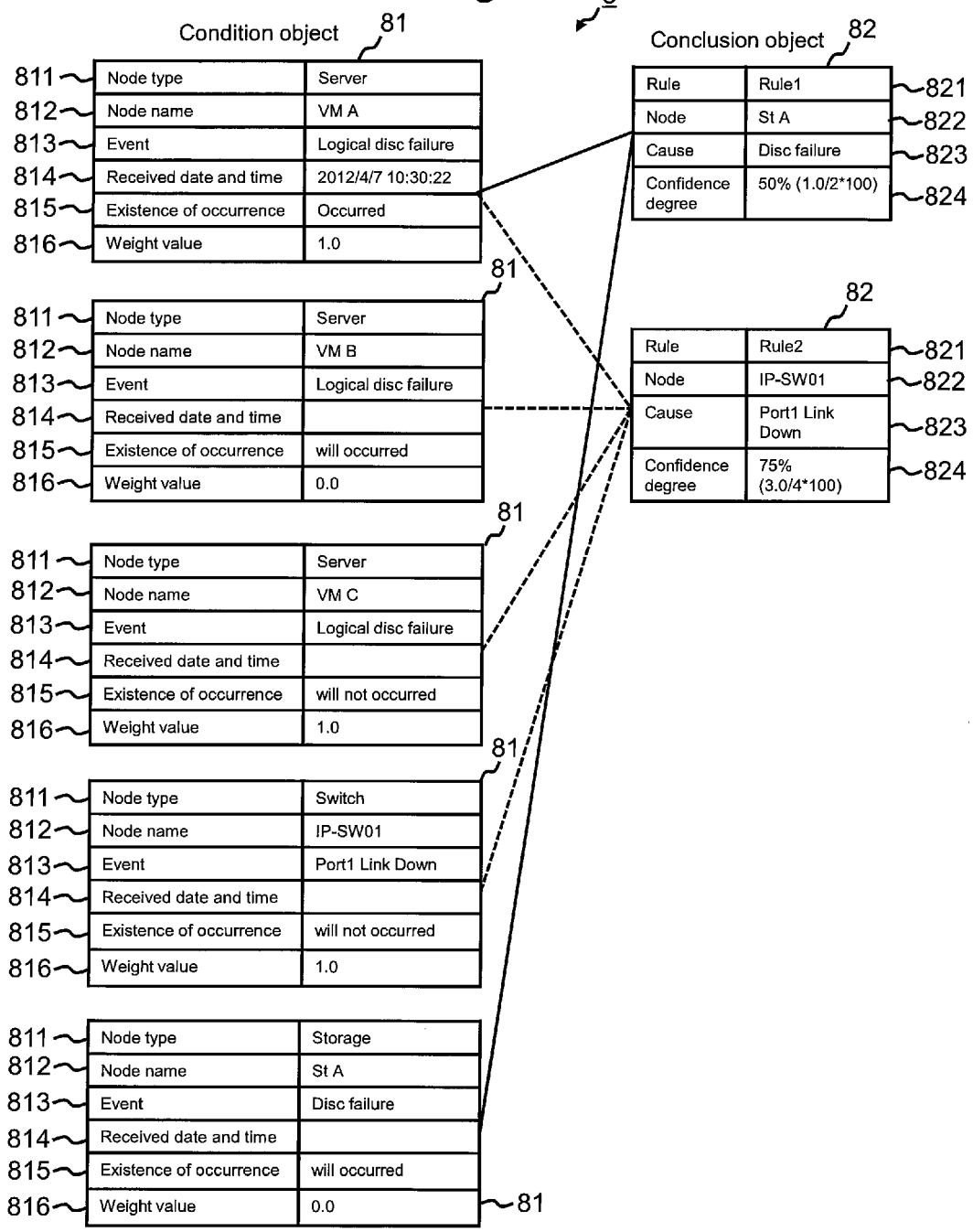

Fig. 9

| Task start date and time | Node name | Event type | Decline rate (point/minute) |
|---|---|---|---|
| 2012/4/7 10:30:22 | VM A | Logical disc failure | 0.3 |
| 2012/4/7 10:11:02 | St C | Unreachable error | 0.2 |

Fig. 18

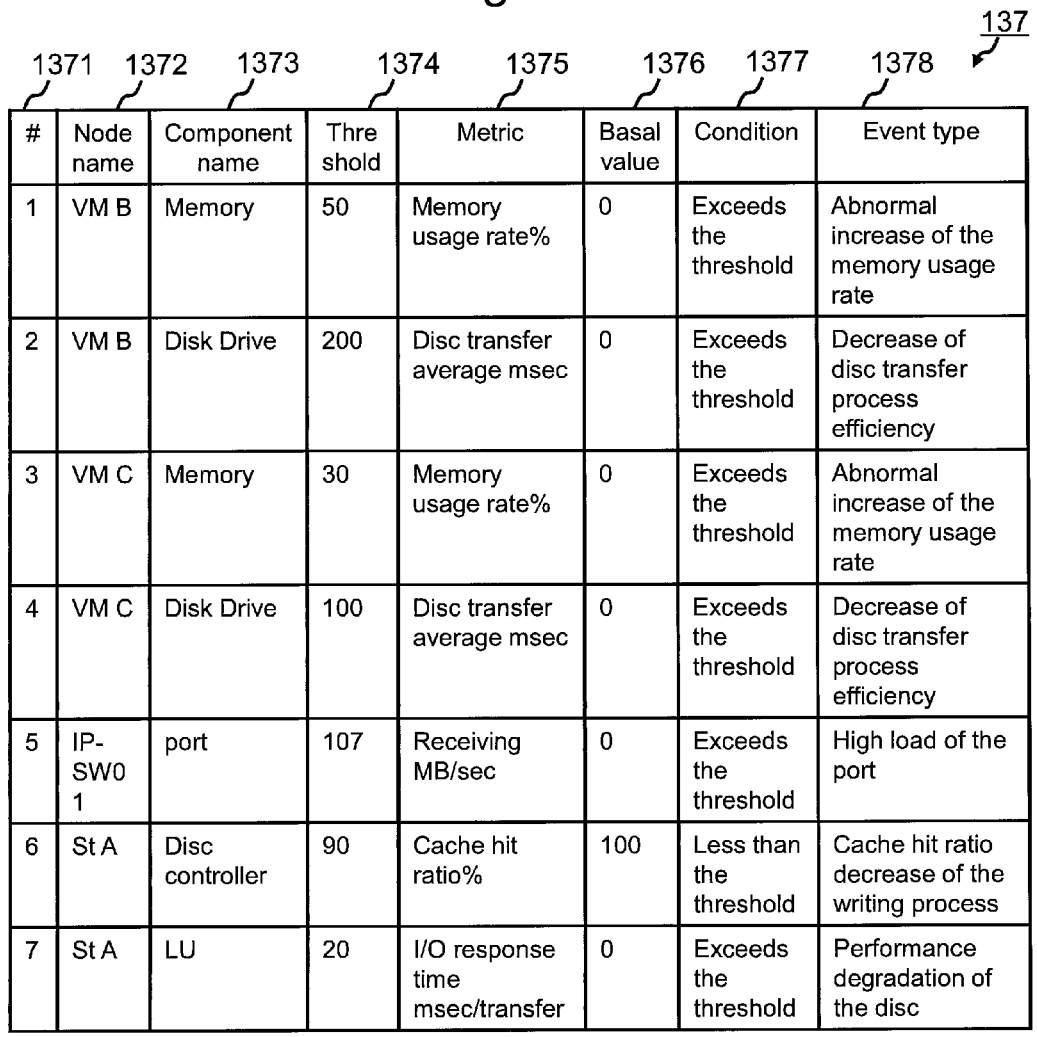

| # | Node name | Component name | Threshold | Metric | Basal value | Condition | Event type |
|---|---|---|---|---|---|---|---|
| 1 | VM B | Memory | 50 | Memory usage rate% | 0 | Exceeds the threshold | Abnormal increase of the memory usage rate |
| 2 | VM B | Disk Drive | 200 | Disc transfer average msec | 0 | Exceeds the threshold | Decrease of disc transfer process efficiency |
| 3 | VM C | Memory | 30 | Memory usage rate% | 0 | Exceeds the threshold | Abnormal increase of the memory usage rate |
| 4 | VM C | Disk Drive | 100 | Disc transfer average msec | 0 | Exceeds the threshold | Decrease of disc transfer process efficiency |
| 5 | IP-SW01 | port | 107 | Receiving MB/sec | 0 | Exceeds the threshold | High load of the port |
| 6 | St A | Disc controller | 90 | Cache hit ratio% | 100 | Less than the threshold | Cache hit ratio decrease of the writing process |
| 7 | St A | LU | 20 | I/O response time msec/transfer | 0 | Exceeds the threshold | Performance degradation of the disc |

Fig. 19

Event occurrence rule repository 134

| # | Node type | Event type | Event occurrence condition ||||
|---|---|---|---|---|---|---|
| | | | Survey target | Survey period | Value | Metric |
| 1 | Server | Decrease of disc transfer process efficiency | Disk Drive | ... | Greater than 0 at least one time | Disc transfer average msec |
| 2 | Switch | High load of the port | port | ... | Greater than 0 at least one time | Receiving MB/sec |
| 3 | Storage | Performance degradation of the disc | LU | ... | Greater than 0 at least one time | I/O response time msec/transfer |

1340

1341 1342 1343 1344a 1344b 1344 1344c 1344d

MONITORING SYSTEM AND MONITORING PROGRAM WITH DETECTION PROBABILITY JUDGMENT FOR CONDITION EVENT

TECHNICAL FIELD

The present invention relates to a monitoring system and a monitoring program that analyze the root cause of events occurred on the monitoring target node apparatus.

BACKGROUND ART

A monitoring system that monitors node apparatuses such as server, storage, network apparatuses, and detects events such as failures or status changes occurred on a monitoring target node apparatus, and analyzes a root cause of the detected events, is known. (See Patent Citation 1, for example).

For example, the monitoring system calculates a degree of confidence indicating probability that each conclusion is a cause based on the plural rules ("Event cause information," hereafter) indicating correspondence relationship between one or more condition events regarding any of the plurality of node apparatuses, and a conclusion to be the cause in the case where one or more condition events have occurred and the existence of detection of the condition events on a root cause analysis. For example, a degree of confidence on some conclusion is a ratio of the number of condition events detected by the monitoring system among the condition events associated with the conclusion to the total number of events associated with the conclusion. The monitoring system extracts candidates of a cause based on the calculated degree of confidence and displays result of a cause analysis including them. An administrator refers to the result of a cause analysis displayed on the monitoring system and estimates the root cause.

PRIOR ART LITERATURE

Patent Literature

[PTL 1]
U.S. Pat. No. 7,107,185

SUMMARY OF INVENTION

Solution to Problem

There is a case where the monitoring system cannot detect an event that is originally expected to occur due to the reason that either situation where an event can possibly occur or an event occurrence can possibly be notified is not in place on the monitoring target node apparatus. For example, in case a cause and effect relationship, whenever a "Port Link Down" event ("Event 1," hereafter) concerning IP switch 1 occurs, a "Logical disc failure" event ("Event 2," hereafter) concerning VM (Virtual Machine) 1 and a "Logical disc failure" event ("Event 3," hereafter) concerning VM 2 then occur as a result of the influence of the former, exists, for example, in case the VM 1 is in the middle of a shutdown, even if the Event 1 occurs, the monitoring system cannot detect the Event 2 that is originally expected to occur due to the reason that VM 1 is not under the circumstances to generate the Event 2.

In this way, in case the monitoring system cannot detect an event that is originally expected to occur, a degree of confidence of a conclusion associated with the event which cannot be detected will be calculated lower than the original value.

For example, in case the above mentioned cause and effect relationship exists, the monitoring system has a rule in which the Event 1 is the conclusion and each of the Event 1, Event 2, and Event 3 is the condition event. And, based on this rule and the existence of a detection of the Event 1, Event 2 and Event 3, the monitoring system calculates a degree of confidence with which the Event 1 is identified as the cause, as a ratio of the number of occurred condition events among the Event 1, Event 2 and Event 3 to the number (in this example, 3) of condition events (Event 1, Event 2 and Event 3). When the Event 1 occurs, the Even 2 and Event 3 should occur influenced by that and the occurred events (Event 1, Event 2, and Event 3) should be detected by the monitoring system. And, in case the monitoring system detects all of the events, 1, 2 and 3, a degree of confidence on which the Event 1 is the cause, will be calculated as (3/3×100)%.

However, for example, in case VM1 is in the middle of shutdown and the monitoring system cannot detect the Event 2, a degree of confidence with which the Event 1 is identified as the cause will be (⅔×100) % at most. And, the greater the condition event which the monitoring system cannot detect, the lower a degree of confidence will be calculated.

In this way, when a degree of confidence is calculated lower than the original value, the monitoring system which extracts the candidates of cause or the administrator who estimates a cause may overlook a conclusion for which a degree of confidence is calculated low, from an extraction or an estimation target.

A monitoring system performs a cause analysis of an event which occurs in any of a plurality of node apparatuses. A storage device of the monitoring system is configured to store a plurality of rules indicating a correspondence relationship between one or more condition events regarding any of the plurality of node apparatuses, and a conclusion to be the cause of one or more condition events in the case where the condition events have occurred. A control device of the monitoring system detects one or more condition events of a plurality of condition events included in the plurality of rules and specify the first conclusion associated with the detected condition event based on the rule and perform a detection possibility judgment on whether a monitoring system can detect the condition event or not, for each of one or more condition events out of a plurality of condition events included in the plurality of rules and calculate the first index value indicating the certainty of the first conclusion being the cause, based on the existence of detection of one or more condition events associated with the first conclusion and the result of the detection possibility judgment.

BRIEF DESCRIPTION OF DRAWINGS

FIG. 4 is an example configuration of an event queue table according to the Embodiment 1.

FIG. 5 is an example configuration of a performance information table according to the Embodiment 1.

FIG. 6 is an example configuration of an event occurrence rule repository according to the Embodiment 1.

FIG. 7 is an example configuration of a rule memory data according to the Embodiment 1.

FIG. 9 is an example configuration of an event erase task table according to the Embodiment 1.

FIG. 18 is an example configuration of a performance event definition table according to the Embodiment 2.

FIG. 19 is an example configuration of an event occurrence rule repository according to the Embodiment 2.

DESCRIPTION OF EMBODIMENTS

Some embodiments of the present invention are now described hereinafter with reference to the drawings. Further, it should be noted that the embodiments described hereafter are not limited to the invention relating to the claim and all of the elements described in the embodiments and their combinations may not be essential for solution means of the invention. In these figures, the same reference symbols show the same components through the plurality of drawings.

Further, in the description hereafter, the information of the present invention is described with an expression such as "aaa table" but such information may be expressed a data structure other than a table. Therefore, in order to indicate non dependence on a data structure, it may be called "aaa information" as for "aaa table".

Further, on explaining each kind of information content, expressions including "identification information", "identifier", "name", "title" and "ID" are used. However, these may be exchangeable with each other.

In the explanation hereafter, there are some places where the explanation is given with "program" as a grammatical subject. However, since a program performs predetermined processes by using a memory and a communication port (Network I/F) by being executed by a processor, it is possible to employ an explanation in which the processor is referred to as a grammatical subject. Further, processes disclosed with a program as a grammatical subject may be processes performed by a computer such as a monitoring system, etc. Further, a part or whole of the program may be implemented by a dedicated hardware. Further, the various programs may be installed to each computer by a program distribution server or, computer-readable recording medium.

Hereafter, a set of one or more computers that monitor a computer system and display information for display may be called as a monitoring system. In case a monitoring computer displays information for display, a monitoring computer is a monitoring system. In addition, a combination of a monitoring computer and an apparatus for display is also a monitoring system. Further, processes equivalent to the monitoring computer may be implemented by a plurality of computers for acceleration and enhanced reliability. In this case, the plurality of computers (including an apparatus for display in case a display is performed by an apparatus for display) are a computer system.

[Embodiment 1]

Figure 1:
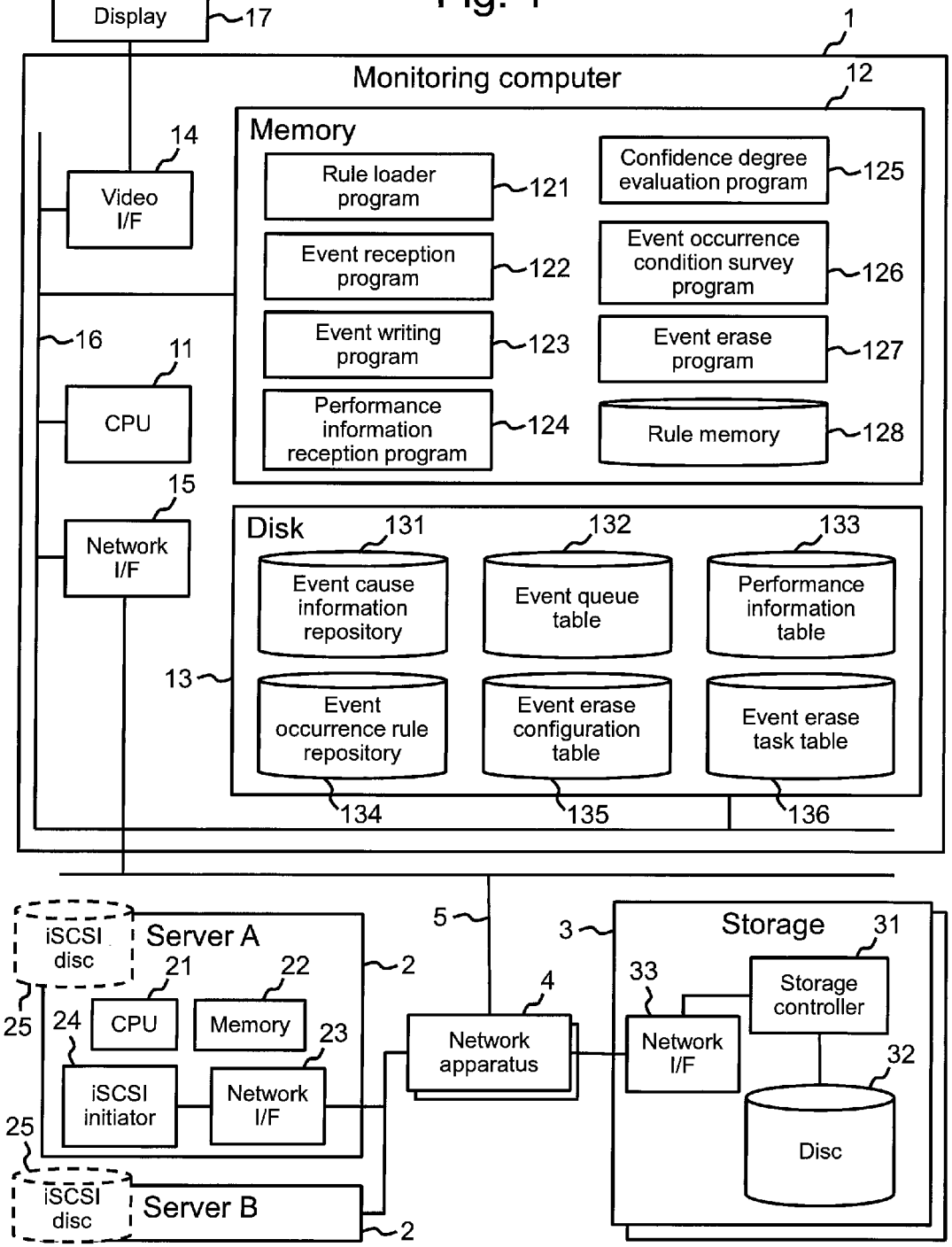
FIG. 1 is an example configuration of a computer system according to the Embodiment 1.

FIG. 1 is an example configuration of a computer system according to the Embodiment 1.

A computer system includes a monitoring computer 1, one or more servers 2 (in the Fig, server A and B), one or more storages 3, one or more network apparatuses 4, and a communication network 5 such as LAN (Local Area Network). The network apparatus 4 is an IP (Internet Protocol) switch, a router or the like. The monitoring computer 1, the server 2 and the storage 3 are coupled mutually via the communication network 5 and the network apparatus 4.

Hereafter, an apparatus that comprises the computer system (the server 2, the storage 3, the network apparatus 4 and the like) can also be called as "node apparatus". The computer system may include, for example, a host computer, a NAS (Network Attached Storage), a file server and a printer as node apparatus. In addition, a logical or physical component such as a device included by the node apparatus can also be called as "component". As an example of the component, a CPU (Central Processing Unit), a memory, a network I/F (interface), a disc, a program, a volume which is defined in the storage 3, and a RAID (Redundant Arrays of Inexpensive Disks) group or the like can be listed. Hereafter, a node apparatus which is a target of monitoring with the monitoring computer 1 can also be called as "monitoring target apparatus".

The server 2 is a computer which executes a server program and the like and provides a predetermined service to a user. The server 2 includes a CPU 21, a memory 22, a network I/F 23 and an iSCSI (Internet Small Computer System Interface) initiator 24. In the server 2, an iSCSI disc 25 which is a virtual volume to which a storage area of the storage 3 is allocated is formed. The server 2 can use the iSCSI disc 25 like a local hard disc via the iSCSI initiator 24. The network I/F 23 is an interface device for coupling to the communication network 5. For example, in case some event occurs in the server 2, the server 2 sends an event message indicating the event occurrence to the monitoring computer 1. Further, the server 2 may be a physical server or a virtual server which runs one or more VMs. In the present embodiment, in case the server 2 is a virtual server, each VM which the virtual server runs is a node apparatus.

The storage 3 is an apparatus for providing a server 2 and the like with a storage area. The storage 3 includes a storage controller 31, a disc 32 and a network I/F 33. The storage 3 may include other types of storage media such as a solid storage medium or an optical storage medium instead of or in addition to the disc 32. The network I/F 33 is an interface device for coupling to the communication network 5. The storage 3, for example, provides the server 2 with a storage area to form an iSCSI disc 25. For example, in case some event occurs in the storage 3, the storage 3 sends an event message indicating the event occurrence to the monitoring computer 1. Further, the server 2 may be configured to detect an event occurred in the storage 3, and send an event message of an event occurred in the storage 3 to the monitoring computer 1.

The monitoring computer 1 is a computer for managing the monitoring target apparatus. The monitoring computer 1, for example, is a general-purpose computer and includes a CPU 11, a memory 12, a disc 13, a video I/F 14, a network I/F 15 and a bas 16. The CPU 11, the memory 12, the disc 13, the video I/F 14 and the network I/F 15 are coupled mutually via a bas 16.

The memory 12 is configured to store a rule loader program 121, an event reception program 122, an event writing program 123, a performance information reception program 124, a confidence degree evaluation program 125, an event occurrence condition survey program 126, an event erase program 127 and a rule memory 128. Various programs from 121 to 127 are executed by the CPU 11. The rule memory 128 is configured to store a rule memory data used for a confidence degree evaluation process to calculate the confidence degree. The disc 13 is configured to store an event cause information repository 131, an event queue table 132, a performance information table 133, an event occurrence rule repository 134, an event erase configuration table 135, and an event erase task table 136. The event cause information repository 131 is configured to store one or more pieces of event cause information (rule). In the present embodiment, as for the event cause information, there are two types of rules; a general rule described in the form independent of an actual configuration of the computer system, and an expansion rule in which the general rule is expanded in the form dependent on an actual configuration of the computer system. The event occurrence rule repository 134 is configured to store one or more event occurrence rules. Here, the event occurrence rule is a rule to determine whether the situation where the event can occur or the event occurrence can be notified is in place or not on the node apparatus regarding the target event, that is, a rule to determine whether the monitoring computer 1 can detect the event or not.

The network I/F 15 is an interface device to couple to a communication network 5. The video I/F 14 is an interface device to couple to a display 17. The monitoring computer 1 can present result of a cause analysis and the like to an administrator by causing the display 17 to display result of a cause analysis or other information. In addition, the monitoring computer 1 may include the display 17 inside.

The monitoring computer 1, for example, receives an event message indicating an event occurrence in the monitoring target apparatus and various information such as performance information regarding the monitoring target apparatus. The monitoring computer 1, for example, performs various processes such as an event cause analysis process (a confidence degree evaluation process) based on various information received from the monitoring target apparatus and output results of the process.

Figure 2:
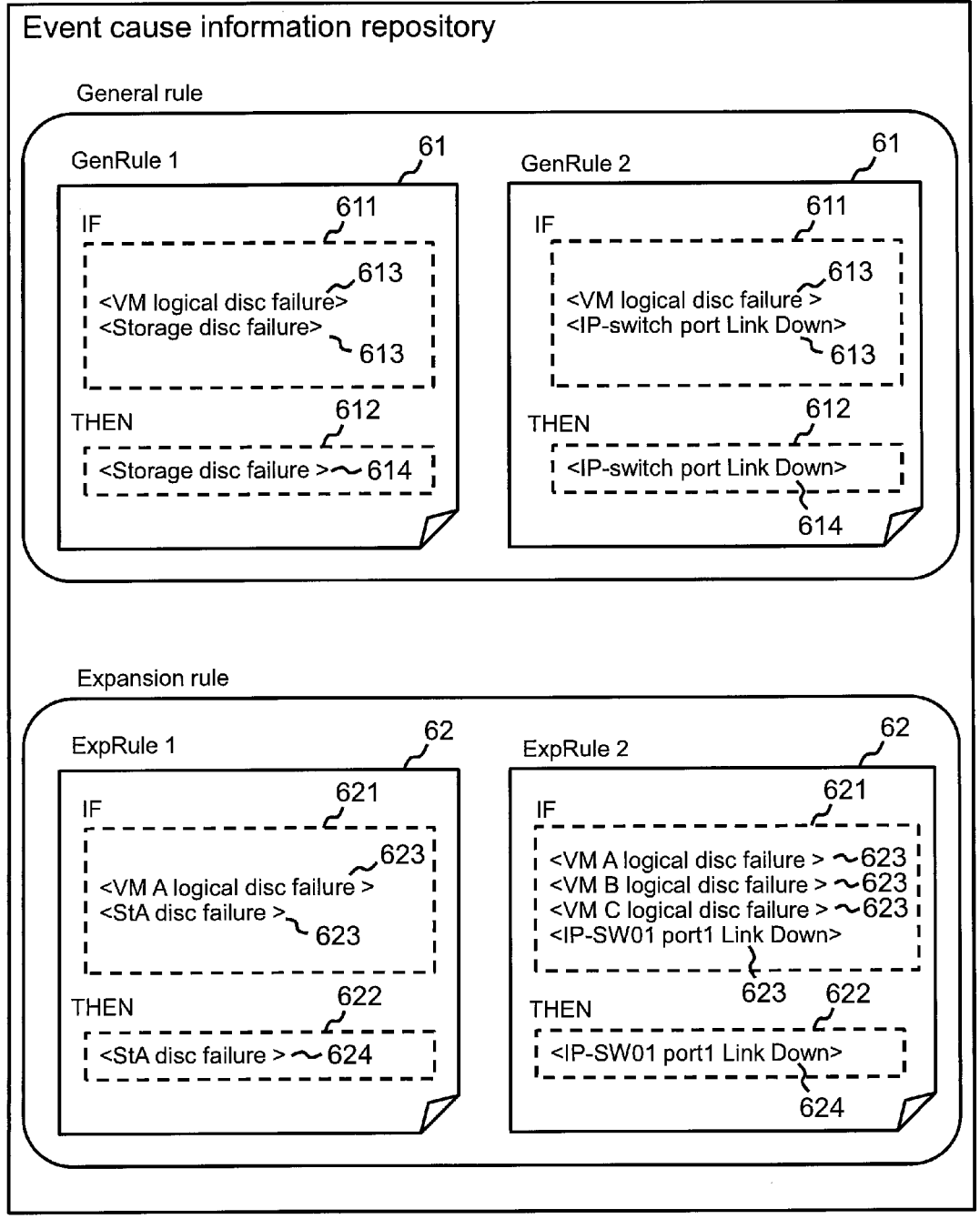
FIG. 2 is an example configuration of an event cause information repository according to the Embodiment 1.

FIG. 2 is an example configuration of the event cause information repository according to the Embodiment 1.

The event cause information repository 131 is configured to store one or more general rules 61 and one or more expansion rules 62. The general rule 61 is the information that describes association between one or more condition events regarding any of the node apparatuses and a conclusion specified as a cause in a case where the condition events occur in a form independent of an actual configuration of the computer system. The general rule 61 may include a plurality of conclusions. In the present embodiment, a conclusion is an event and a conclusion may be called as a conclusion event.

The general rule 61 includes an IF section 611 and a THEN section 612. The IF section 611 includes one or more condition event data elements 613. The condition event data element 613 indicates a condition event regarding a node apparatus that is abstracted by type, for example, it includes a data indicating the type of the node apparatus related to the condition event and a data indicating the type of the condition event. Added to that, the THEN section 612 includes a conclusion event data element 614. The conclusion event data element 614 indicates a conclusion event regarding a node apparatus abstracted by type, for example, it includes a data indicating the type of the node apparatus related to the conclusion event and a data indicating the type of the conclusion event.

For example, a general rule, "GenRule1" in the FIG. includes two condition event data elements 613 and one conclusion event data element 612. That is, the general rule "GenRule1" represents that, in a case where two condition events indicated by each of the two condition event data elements 613 are detected, a conclusion event indicated by the conclusion event data element 614 is specified as a cause. To be more specific, two condition event data elements 613 included in the general rule "GenRule1" indicate a "logical disc failure" event regarding VM and a "disc failure" event regarding the storage 3 respectively. In addition, the conclusion event data element 614 included in the general rule "GenRule1" indicates a "disc failure" event regarding the storage 3. Therefore, the general rule "GenRule1" represents that, in a case where the "logical disc failure" event regarding VM and the "disc failure" event regarding the storage 3 are detected, the "disc failure" event regarding the storage 3 is specified as a cause. In the same way, the general rule "GenRule2" represents that, in a case where the "logical disc failure" event regarding VM and the "Port Link Down" event regarding the IP switch are detected, the "Port Link Down" event regarding the IP switch is specified as a cause.

The expansion rule 62 is the information in which the general rule 61 is expanded in the form dependent on an actual configuration of the computer system. The expansion rule 62 may include a plurality of conclusions. As well as the general rule 61, the expansion rule 62 includes an IF section 621 and a THEN section 622. The IF section 621 includes one or more condition event data elements 623. The condition event data element 623 indicates a condition event regarding a concrete node apparatus, for example, it includes the name of the node apparatus related to the condition event and a data indicating the type of the condition event. Added to that, the THEN section 622 includes a conclusion event data element 624. The conclusion event data element 624 indicates a conclusion event regarding a concrete node apparatus, for example, it includes the name of the node apparatus related to the conclusion event and a data indicating the type of the conclusion event.

For example, an expansion rule, "ExpRule1" in the FIG. includes two condition event data elements 623 and one conclusion event data element 624. That is, the expansion rule "ExpRule1" represents that, in a case where two condition events indicated by each of the two condition event data elements 623 are detected, a conclusion event indicated by the conclusion event data element 624 is specified as a cause. To be more specific, two condition event data elements 623 included in the expansion rule "ExpRule1" indicate a "logical disc failure" event regarding VM A and a "disc failure" event regarding the storage A (referred to as "StA" in the FIG.) respectively. In addition, the conclusion event data element 624 included in the expansion rule "ExpRule1" indicates a "disc failure" event regarding the storage A. Therefore, the expansion rule "ExpRule1" represents that, in a case where the "logical disc failure" event regarding VM A and the "disc failure" event regarding the storage A are detected, the "disc failure" event regarding the storage A is specified as a cause. In the same way, the expansion rule "ExpRule2" represents that, in a case where the "logical disc failure" event regarding VM A, the "logical disc failure" event regarding VM B, the "logical disc failure" event regarding VM C and the "Port Link Down" event regarding the IP switch 1 (Referred to as "IP-SWO1" in the FIG.) are detected, the "Port Link Down" event regarding an IP switch 1 is specified as a cause.

Figure 3:
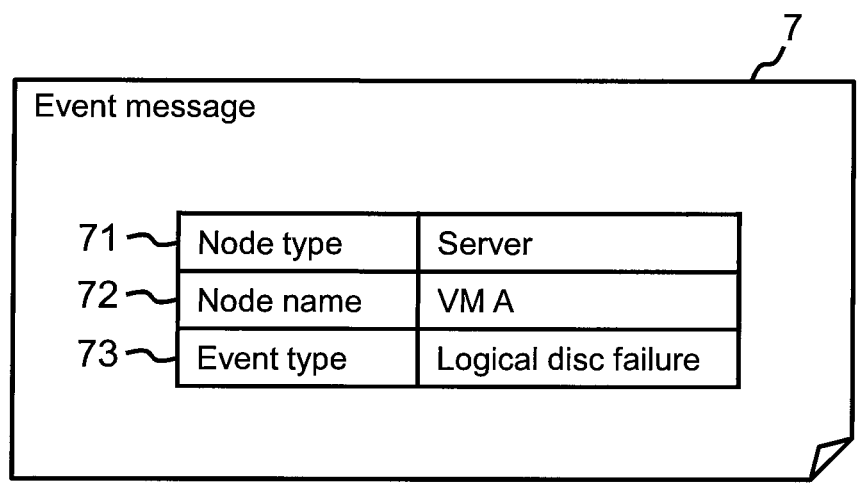
FIG. 3 is an example configuration of an event message according to the Embodiment 1.

FIG. 3 is an example configuration of an event message according to the Embodiment 1.

The event message 7 is the information that is sent to notify the monitoring computer 1 that an event has occurred in the monitoring target apparatus. The event message 7 includes fields of a node type 71, a node name 72 and an event type 73. In the node type 71, data indicating the type of the node apparatus related to the occurred event is stored. In the node name 72, the name of the node apparatus related to the occurred event is stored. In the event type 73, data indicating the type of the occurred event is stored.

FIG. 4 is an example configuration of the event queue table according to the Embodiment 1.

The event queue table 132 is a table to manage information related to the events detected by the monitoring computer 1. In case the event reception program 122 receives an event message 7, the event reception program 122 makes an entry regarding the event notified by the received event message 7 and stores the entry in this table 132.

The event queue table 132 includes fields of a number (referred to as "#" in the FIG. 1321, a node type 1322, a node name 1323, an event type 1324 and a received date and time 1325. In the number 1321, the number of the entry to be registered in the event queue table 132 is stored. In the node type 1322, the type of the node apparatus regarding the event is stored. In the node name 1323, the name of the node apparatus regarding the event is stored. In the event type 1324, data indicating the type of the event is stored. In the received date and time 1325, data indicating a received date and time of the event message 7 showing an event occurrence is stored.

FIG. 5 is an example configuration of the performance information table according to the Embodiment 1.

The performance information table 133 is a data to manage a performance value regarding the monitoring target apparatus. The performance information 133 includes fields of a number 1331, a node name 1332, a component name 1333, a collection start date and time 1334, a collection period 1335, a value 1336 and a metric 1337. In the number 1331, the number of the entry to be registered in the performance information table 133 is stored. In the node name 1332, the name of the monitoring target apparatus related to the performance value is stored. In the component name 1333, the name of the component related to the performance value on the node apparatus is stored. In the collection start date and time 1334, data indicating a started date and time of collection of the performance value in stored. In the collection period 1335, data indicating a collection period of the performance value is stored. In the value 1336, the performance value is stored. In the metric 1337, data indicating the type of the performance value is stored.

For example, it is understood that a performance value regarding disc drive of VM A, to be more specific a disc transfer average time (an average value of time used for transferring a predetermined amount data), between 10 hour 00 minute 00 second and 10 hour 05 minute 00 second April 7$^{th}$ 2012 is 60 [msec] from an entry whose number 1331 is "1" in the FIG. In addition, for example, it is understood that the network I/F 23 of VM B sent a Ping response (response message for Ping command) once between 10 hour 10 minute 00 second and 10 hour 15 minute 00 second April 7$^{th}$ 2012 from an entry whose number 1331 is "10" in the FIG.

FIG. 6 is an example configuration of the event occurrence rule repository according to the Embodiment 1.

The event occurrence rule repository 134 is configured to store one or more event occurrence rules 1340. The event occurrence rule repository 134 comprises, for example, a table, and includes fields of a number 1341, a node type 1342, an event type 1343 and an event occurrence condition 1344. The event occurrence condition 1344 includes fields of a survey target 1344a, a survey period 1344b, a value 1344c and a metric 1344d. Each of the entries registered in an event occurrence rule repository 134 corresponds to the event occurrence rule 1340.

In the number 1341, the number of the entry registered in the event occurrence rule repository 134, that is, the number of the event occurrence rule 1340 is stored. In the node type 1342, data indicating the type of the node apparatus related to the event applicable to the event occurrence rule 1340 is stored. In the event type 1343, data indicating the type of the event applicable to the event occurrence rule 1340 is stored. In the event occurrence condition 1344, data indicating a condition (hereafter, called "event occurrence condition") to determine that the monitoring computer 1 can detect the event applicable to the event occurrence rule 1340 is stored.

In the survey target 1344a, the name of the component related to the performance value indicating the event occurrence condition is stored. In the survey period 1344b, a target period of the event occurrence condition is stored. The target period of the event occurrence condition is for example, a period up until a standard date and time from a date and time which is a predetermined time earlier than a standard date and time. Here, the standard time is a date and time at which a judgment based on the event occurrence rule 1340 (that is, a judgment on whether the monitoring computer 1 can detect a target event or not, hereafter called "detection possibility judgment") is performed. Further, how to determine the date and time which is the predetermined time earlier than the standard time will be described later. In the value 1344c, the performance value indicating the event occurrence condition and data indicating a judgment method based on the performance value are stored. In the metric 1344d, data indicating the type of the performance value showing the event occurrence condition is stored.

For example, an entry whose number 1341 in the FIG. is "1" indicates an event occurrence rule 1340 on a "logical disc failure" event regarding the server 2. And, an event occurrence condition defined by this event occurrence rule 1340 is that the disc transfer average time regarding the disc drive has to be above 0 [msec] at least once within a period indicated by the survey period 1344b. That is, this event occurrence rule 1340 represents that, in a case where the disc transfer average time regarding the disc drive of the server 2 becomes above 0 [msec] at least once within a period indicated by the survey period 1344b on the "logical disc failure" event regarding the server 2, the monitoring computer 1 determines that it can detect this event. This determination is made because a request for accessing the disc drive (logical disc) of the server 2 must have been issued before the "logical disc failure" can occur and whether the request for accessing the disc drive of the server 2 has occurred or not can be inferred by a presence or absence of data input and output for the disc drive of the server 2.

In addition, for example, an entry whose number 1341 in the FIG. is "2" indicates an event occurrence rule 1340 on a "logical disc failure" event regarding the server 2. And, an event occurrence condition defined by this event occurrence rule 1340 is that the network I/F 23 has sent a Ping response at least once within a period indicated by the survey period 1344b. That is, this event occurrence rule 1340 represents that, in a case where the network I/F 23 has sent a Ping response at least once within a period indicated by the survey period 1344b on the "logical disc failure" event regarding the server 2, the monitoring computer 1 determines that it can detect this event. This determination is made because it can be said that the server 2 is not shutting down and is in a situation where a data communication is available in case the network I/F 23 of the server 2 has sent a Ping response.

In addition, for example, an entry whose number 1341 is "3" in the FIG. indicates an event occurrence rule 1340 on a "Port Link Down" event regarding the IP switch. And, an event occurrence condition defined by this event occurrence rule 1340 is that the port receiving speed becomes above 0 [MB (megabyte)/sec] at least once within a period indicated by the survey period 1344b. That is, this event occurrence rule 1340 represents that, in a case where the port receiving speed of the IP switch becomes above 0 [MB (megabyte)/sec] at least once within a period indicated by the survey period 1344b on the "Port Link Down" event regarding the IP switch, the monitoring computer 1 determines that it can detect this event. This determination is made because it can be said that the IP switch is in a situation where a data communication is available in case the data input for the IP switch port is being done.

In addition, for example, an entry whose number 1341 in the FIG. is "4" indicates an event occurrence rule 1340 on a "Port Link Down" event regarding the IP switch. And, an event occurrence condition defined by this event occurrence rule 1340 is that the port sending speed becomes above 0 [MB/sec] at least once within a period indicated by the survey period 1344b. That is, this event occurrence rule 1340 represents that, in a case where the port sending speed of the IP switch becomes above 0 [MB/sec] at least once within a period indicated by the survey period 1344b on the "Port Link Down" event regarding the IP switch, the monitoring computer 1 determines that it can detect this event. This determination is made because it can be said that the IP switch is in a situation where a data communication is available in case the IP switch port is outputting a data.

In addition, for example, an entry whose number 1341 is "5" in the FIG. indicates an event occurrence rule 1340 on a "disc failure" event regarding the storage 3. And, an event occurrence condition defined by this event occurrence rule 1340 is that the I/O (input output) response time regarding a LU (logical unit) becomes above 0 [msec] at least once within a period indicated by the survey period 1344b. That is, this event occurrence rule 1340 represents that, in a case where the I/O response time regarding the LU of the storage 3 becomes above 0 [msec] at least once within a period indicated by the survey period 1344b on the "disc failure" event regarding the storage 3, the monitoring computer 1 determines that it can detect this event. This determination is made because it can be said that the storage 3 is not shutting down and is in a situation where a data communication is available in case the data input/output for the LU of the storage 3 is being done.

FIG. 7 is an example configuration of the rule memory data according to the Embodiment 1.

The rule memory data 8 is a data expressed at least a plurality of expansion rules 62 used for cause analysis of the event, a data indicating a presence or absence of a detection regarding a condition event of the expansion rule 62 and a confidence degree which is the information of probability that the conclusion event of the expansion rule 62 is a cause, by a plurality of objects and those associations. The rule memory data 8 may be created based on the expansion rule 62 or based on the configuration information indicating the system configuration of the computer system and the general rule 61. The expansion rule 62 is not necessarily stored in the event cause information repository 131 in case the rule memory data 8 is created based on the general rule 61 and the configuration information.

The rule memory data 8 includes a plurality of condition objects 81, a plurality of conclusion objects 82 and their connection information. The condition object 81 corresponds to the condition event of the expansion rule 62 and the conclusion object 82 corresponds to the conclusion event of the expansion rule 62. A connection relationship between the condition object 81 and the conclusion object 82 indicates a correspondence relationship between the condition event and the conclusion event on the expansion rule 62. Further, each object is implemented for example as a structure or a class in a computer language and is the data (object data) stored in the memory 12 during the operation of the program.

The condition object 81 is an object to manage the data regarding the condition event. The condition object 81 includes fields of a node type 811, a node name 812, an event 813, a received data and time 814, an existence of occurrence 815 and a weight value 816. In the node type 811, data indicating the type of the node apparatus related to the condition event corresponding to this condition object 81 is stored. In the node name 812, the name of the node apparatus related to the condition event corresponding to this condition object 81 is stored. In the event 813, data indicating the type of the condition event corresponding to this condition object 81 is stored. In the received date and time 814, data indicating a received date and time of the event message 7 indicating the occurrence of the condition event corresponding to this condition object 81, that is, data indicating a date and time (detected date and time) at which the condition event corresponding to this condition object 81 is detected by the monitoring computer 1 is stored.

In case the monitoring computer 1 has detected the condition event corresponding to this condition object 81, that is, in case the monitoring computer 1 has received the event message indicating the occurrence of the condition event corresponding to this condition object 81, data indicating that, for example "Occurred" is stored in the existence of occurrence 815. On the other hand, in case the monitoring computer 1 has not detected the corresponding condition event, the following data is stored in the existence of occurrence 815. That is, in case the detection possibility judgment on this event has not been done yet, data indicating that, for example "Uncheck" is stored. In addition, in case the detection possibility judgment on this condition event has been done and judgment result showing that the monitoring computer 1 can detect the event, has been obtained, data indicating that, for example "will occurred" is stored. Added to that, incase the detection possibility judgment on this condition event has been done and judgment result showing that the monitoring computer 1 cannot detect the event, has been obtained, data indicating that, for example "will not occurred" is stored.

In the weight value 816, a weight value configured to the condition event corresponding to this condition object 81 is stored. The weight value is the data to refer when the monitoring computer 1 calculates the confidence degree (described later as the first confidence degree). In the present embodiment, the weight value is a value within a range between "0.0" and "1.0". In the present embodiment, the monitoring computer 1 is configured the weight value to the condition event as follows. That is, once the monitoring computer 1 detects the condition event, it will be configured a weight value "1.0" to the condition event. Then, the weight value of the condition event will be kept "1.0" until a validity period set in advance in the condition event, has elapsed. And, after the validity period set in advance in the condition event has elapsed, the monitoring computer 1 will decrease the weight value of the condition event to "0.0" according to the decline rate set in advance in the condition event. To be more specific, the monitoring computer 1 will repeatedly perform to configure a value of subtracting the decline rate from the weight value previously set as a new weight value until the weight value has become equal to or smaller than "0.0" every predetermined time (for example 1 minute). Then, the weight value of the condition event will be kept "0.0" until the condition event has been detected again.

For example, the first condition object 81 (hereafter called "the first condition object) from above of the FIG. manages the data regarding the condition event of "logical disc failure" on VM A. In the received date and time 814 of the first condition object, "10 hours 30 minutes 22 seconds on Apr $7^{th}$ 2012" is stored. Therefore, the first condition object indicates that the condition event of "logical disc failure" regarding VM A has been detected by the monitoring computer at 10 hours 30 minutes 22 seconds on Apr $7^{th}$ 2012. In addition, for example the second condition object 81 (hereafter called "the second condition object" from above of the FIG. manages the data regarding a condition event of "logical disc failure" on VM B. In the received date and time 814 of the second condition object, the data indicating a received date and time is not stored. Therefore, the second condition object indicates that the condition event of "logical disc failure" regarding VM B has not been detected by the monitoring computer 1. Added to that, in the existence of occurrence 815 of the second condition object, "will occurred" is stored. Therefore, the second condition object indicates that the detection possibility judgment on the condition event of "logical disc failure" regarding VM B has been done and judgment result showing that the monitoring computer 1 can detect the event, has been obtained.

The conclusion object 82 is an object to manage the data regarding the conclusion event. The conclusion object 82 includes fields of a rule 821, a node 822, a cause 823 and a confidence degree 824. In the rule 821 the name of the expansion rule 62 including the conclusion event corresponding to this conclusion object 82 is stored. In the node 822, the name of the node apparatus related to the conclusion event corresponding to this conclusion object 82 is stored. In the cause 823, data indicating the type of the conclusion event corresponding to this conclusion object 82 is stored. In the confidence degree 824, the confidence degree (the first confidence degree) on the conclusion event corresponding to this conclusion object 82 is stored. The confidence degree is calculated in the confidence degree evaluation process described later.

Further, the rule memory data 8 is not limited to a structure described in the FIG. 7 and may be another data structure which can express a correspondence relationship between a condition event and a conclusion event, a presence and absence of condition event detection, result of the detection possibility judgment on a condition event and a confidence degree on a conclusion event.

Figure 8:
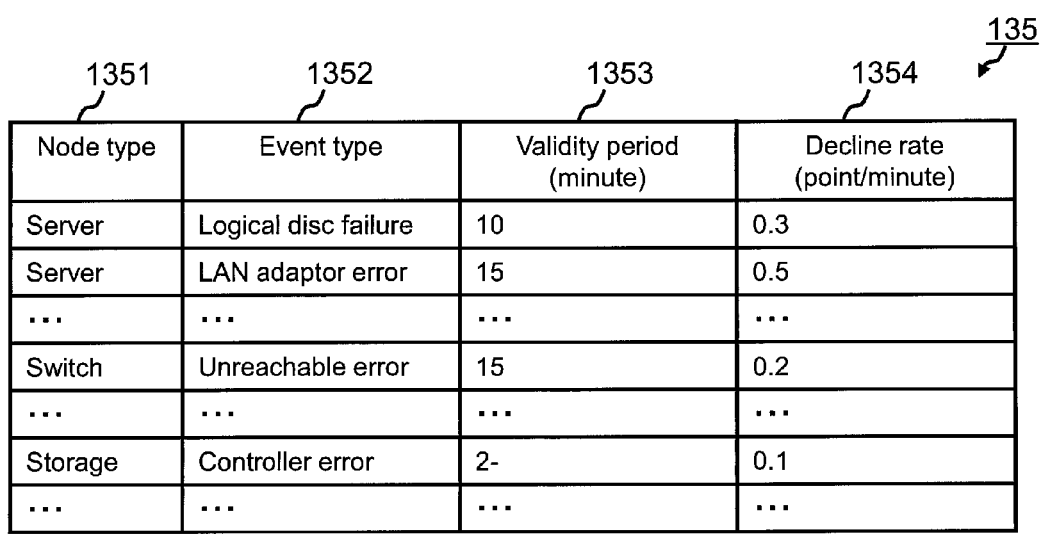
FIG. 8 is an example configuration of an event erase configuration table according to the Embodiment 1.

FIG. 8 is an example configuration of the event erase configuration table according to the Embodiment 1.

The event erase configuration table 135 is a data to manage the validity period and the decline rate set in advance on each event possible to occur in the computer system. The event erase configuration table 135 includes fields of a node type 1351, an event type 1352, a validity period 1353 and a decline rate 1354. In the node type 1351, data indicating the type of the node apparatus related to the event is stored. In the event type 1352, data indicating the type of the event is stored. In the validity period 1353, data indicating the validity period set to the event, that is, a period between the time the weight value has been set to "1.0" and the time the decline starts is stored. In the decline rate 1354, data indicating the decline rate set to the event, that is, a decreased value on every predetermined time (one minute in this present embodiment) in case of decreasing the weight value is stored. For example, it can be understood that a validity period "10 (minutes)" and a decline rate "0.3 (points/minute)" have been set to the "logical disc failure" event regarding the server 2 from an entry on the top of the FIG.

FIG. 9 is an example configuration of the event erase task table according to the Embodiment 1.

The event erase task table 136 is a data to manage information regarding an event erase task on an event detected by the monitoring computer 1. The event erase task is a task to perform a process of decreasing the weight value set to the detected event based on the decline rate set to the event. The event erase task table 136 includes fields of a task start date and time 1361, a node name 1362, an event type 1363 and a decline rate 1364. In the task start date and time 1361, data indicating a date and time of starting an execution of the event erase task, that is, a started date and time (hereafter called "task start date and time") of decreasing the weight value set to a target event of the event erase task is stored. The task start date and time is, for example a date and time which has been obtained by adding a detected date and time (received date and time of an event message 7) of a target event of the event erase task, to a validity period set to the event. In the node name 1362, the name of the node apparatus related to the target event of the event erase task is stored. In the event type 1363, data indicating the type of the target event of the event erase task is stored. In the decline rate 1364, the decline rate set to the target event of the event erase task is stored. For example, it can be understood that an event erase task on the "logical disc failure" event regarding VM A has been started at 10 hours 30 minutes 22 seconds on April $7^{th}$ 2012 and the decline rate adopted by the event erase task is "0.3 (points/minute)" from an entry on the top of the FIG.

An operation of the monitoring computer 1 is described below.

Figure 10:
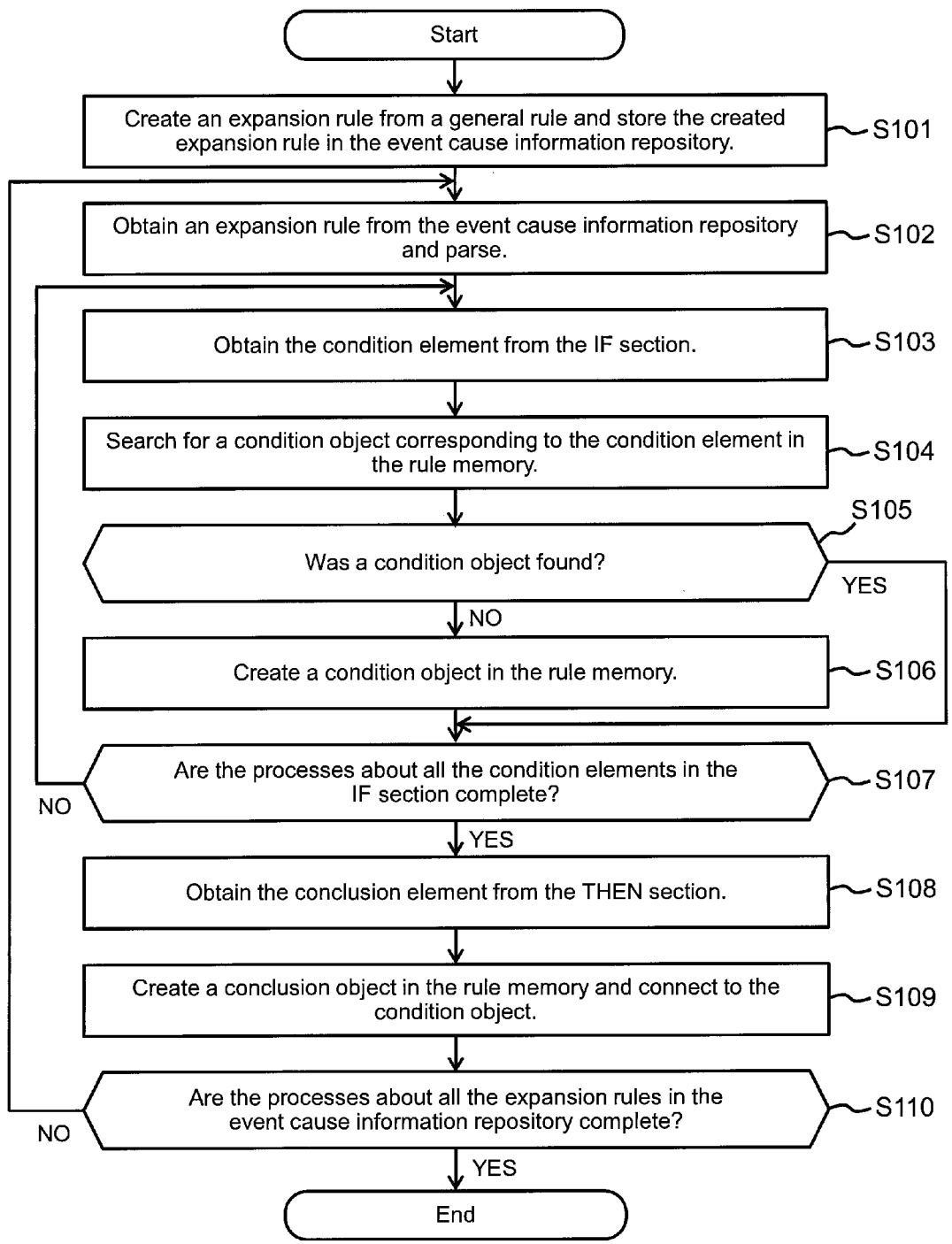
FIG. 10 is a flow chart of a rule memory data creation process according to the Embodiment 1.

FIG. 10 is a flow chart of a rule memory data creation process according to the Embodiment 1.

The rule memory data creation process is a process to create the rule memory data 8 based on the expansion rule 62.

First, the rule loader program 121 creates the expansion rule based on the general rule 61 and the configuration information of the computer system, and stores the created expansion rule 62 in the event cause information repository 131 (step S101).

Then, the rule loader program 121 obtains the expansion rule 62 from the event cause information repository 131 and parses the obtained expansion rule 62 (step S102).

Then, the rule loader program 121 obtains the condition event data element 623 from the IF section 621 of the expansion rule 62 obtained in step S102 (step S103).

After that, the rule loader program 121 examines whether the condition object 81 corresponding to the condition event indicated by the condition event data element 623 obtained in step S103 exists or not in the rule memory data 8 of the rule memory 128 (step S104).

In case the corresponding condition object 81 exists in the rule memory data 8 (step S105: YES), the rule loader program 121 advances the process to step 107.

On the other hand, in case the corresponding condition object does not exist in the rule memory data 8 (step S105: NO), the rule loader program 121 creates a condition object 81 corresponding to the condition event indicated by the condition event data element 623 obtained in step S103, in the rule memory data 8 (step S106). After that, the rule loader program 121 advances the process to step S107.

In step S107, the rule loader program judges whether processes about all condition event data elements 623 in the IF section 621 are complete or not. In case the condition event data element 623 which has not been processed yet is left (step S107: NO), the rule loader program advances the process to step S103.

On the other hand, in case processes about all condition event data elements 623 are complete (step S107: YES), the rule loader program 121 obtains the conclusion event data element 624 from the THEN section 622 of the expansion rule 62 obtained in step S102 (step S108).

After that, the rule loader program 121 creates a conclusion object 82 corresponding to the conclusion event indicated by the conclusion event data element 624 obtained in step S108, in the rule memory data 8. And, the rule loader program 121 couples the created conclusion object 82 and all related condition objects 81 (step S109). Further, the related condition object 81 is a condition object 81 corresponding to the condition event associated with the conclusion event corresponding to the created conclusion object 82 on an expansion rule 62.

After that, the rule loader program 121 judges whether processes about all expansion rules 62 in the event cause information repository 131 are complete or not (step S110). In case an expansion rule 62 which has not been processed yet is left (step S110: NO), the rule loader program 121 advances the process to step S102. On the other hand, in case processes about all expansion rules 62 are complete (step S110: YES), the rule loader program 121 exits the rule memory data creation process.

Figure 11:
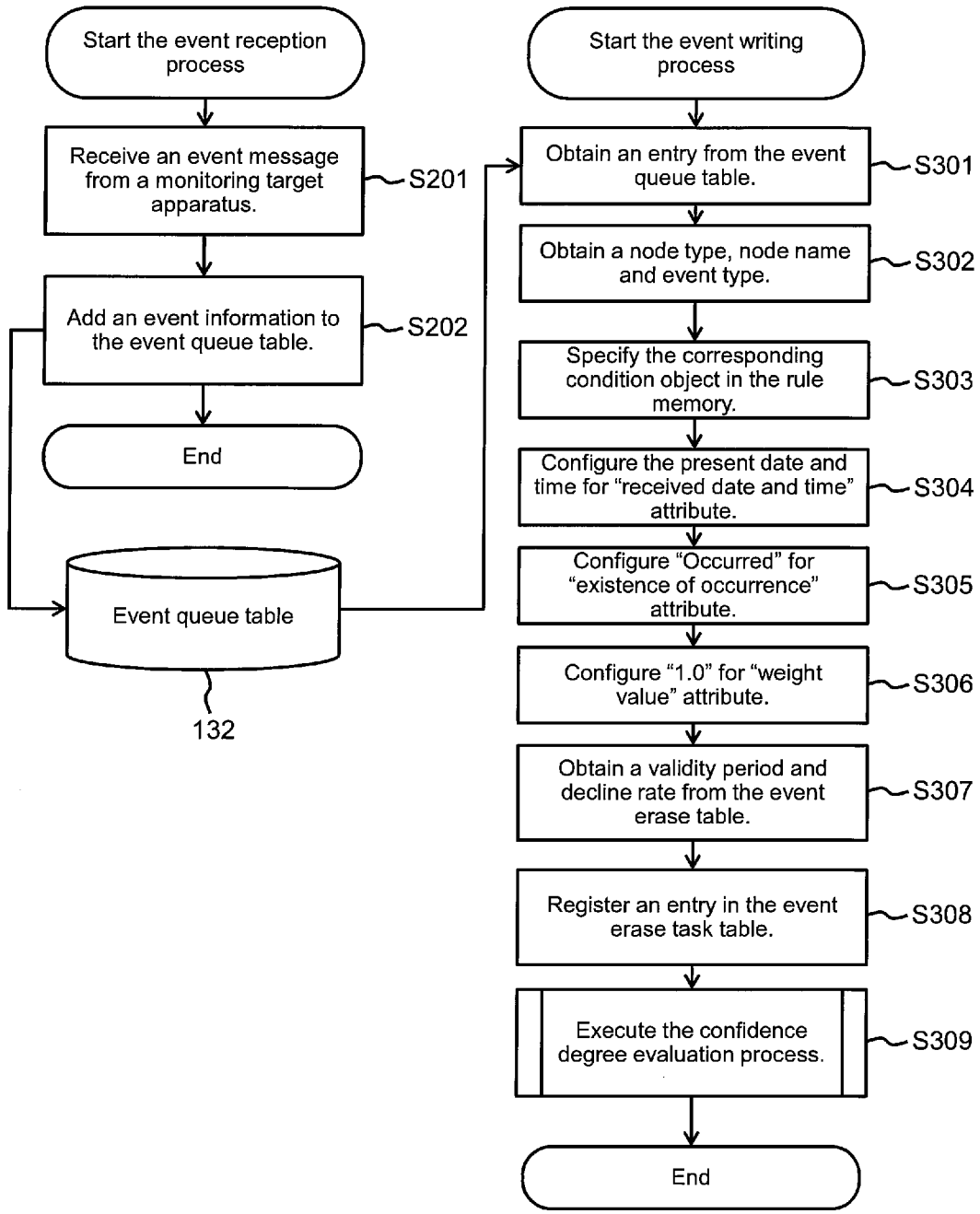
FIG. 11 is a flow chart of an event reception process and event writing process according to the Embodiment 1.

FIG. 11 is a flow chart of an event reception process and event writing process according to the Embodiment 1.

First, the event reception process is described. The event reception process is a process to be done when the monitoring computer 1 receives an event message 7.

When the monitoring computer 1 receives an event message 7 from the monitoring target apparatus (step S201), the event reception program 122 creates an entry of the event queue table 132 regarding an event indicated by the received event message 7 and adds the created entry to the event queue table 132 (step S202). In the created entry, each data obtained from the node type 71, the node name 72 and the event type 73 of the received event message 7, and data indicating the received date and time of the received event message 7 are stored. After that, the event reception program 122 exits the event reception process.

Then, the event writing process is described. The event writing process is a process to store information regarding the detected condition event to the corresponding condition object 81 and register information regarding the event erase task on the detected condition event in the event erase task table 136.

The event writing program 123 obtains one entry from the event queue table 132 (step S301).

Next, the event writing program 123 obtains each data of the node type 1322, the node name 1323 and the event type 1324 from the entry obtained in step S301 (step S302).

After that, the event writing program 123 specifies a condition object 81 corresponding to the event (called "target event" in the description of the FIG. 11) indicated by the entry obtained in step S301 (step S303). To be more specific, the event writing program 123 searches for the rule memory data 8 using the name of the node apparatus and the type of the event indicated by the node name 1323 and the event type 1324 obtained in step S302 as a, key, and specifies a condition object 81 of which the node apparatus name and the event type indicated by the node name 812 and the event 813 match the key.

After that, the event writing program 123 stores a data indicating the present date and time in the received date and time 814 of the condition object 81 specified in step S303 (step S304). In addition, the event writing program 123 stores "Occurred" in the existence of occurrence of the condition object 81 specified in step S303 (step S305). Added to that, the event writing program 123 stores "1.0" in the weight value 816 of the condition object specified in step S303 (step S306).

After that, the event writing program 123 obtains the validity period and the decline rate configured to the target event from the event erase configuration table 135 (step S307).

After that, the event writing program 123 creates an entry of the event erase task table 136 regarding the target event and adds the created entry to the event erase task table 136 (step S308). In the created entry, each data obtained from the node name 1323 and the event type 1324 of the entry obtained in step S301, data indicating the task start date and time, that is a date and time adding a configured validity date in the target event to the present date and time, and the decline rate configured in the target event are stored.

After that, the event writing program 123 causes the confidence degree evaluation program 125 to execute a confidence degree evaluation process (see the FIG. 13) (step S309). Upon executing the confidence degree evaluation process, the event writing program 123 inputs a parameter for designating the condition object 81 specified in step S303, to the confidence degree evaluation program 125. A confidence degree is calculated on each conclusion event associated with the target event by this confidence degree evaluation process. After that, the event writing program 123 ends the event writing process.

Figure 12:
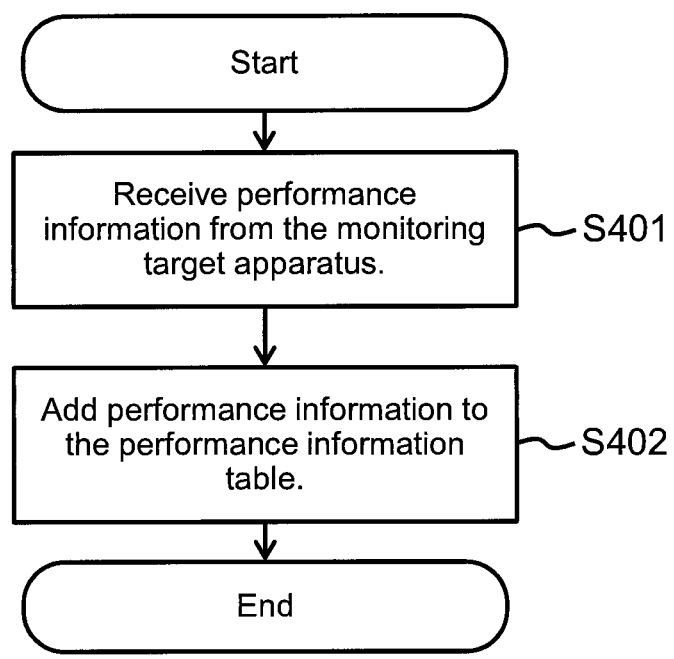
FIG. 12 is a flow chart of a performance information reception process according to the Embodiment 1.

FIG. 12 is a flow chart of a performance information reception process according to the Embodiment 1.

The performance information reception process is a process to be done when the monitoring computer receives the performance information regarding the monitoring target apparatus.

When the monitoring computer receives the performance information including a performance value regarding the monitoring target apparatus from the monitoring target apparatus (step S401), the performance information reception program 124 creates an entry of the performance information table 133 regarding the received performance information and adds the created entry to the performance information table 133 (step S402). In the created entry, an entry number, the performance value included in the received information, the name of the node apparatus and the name of the component related to the performance value, data indicating a started date and time of collection of the performance value, data indicating a collection period of the performance value, data indicating the type of the performance value. After that, the performance information reception program 124 ends the performance information reception process.

Further, the monitoring computer 1 repeatedly receives the performance information periodically or randomly and the performance information reception program 124 performs the performance information reception process every time the monitoring computer 1 receives the performance information.

Figure 13:
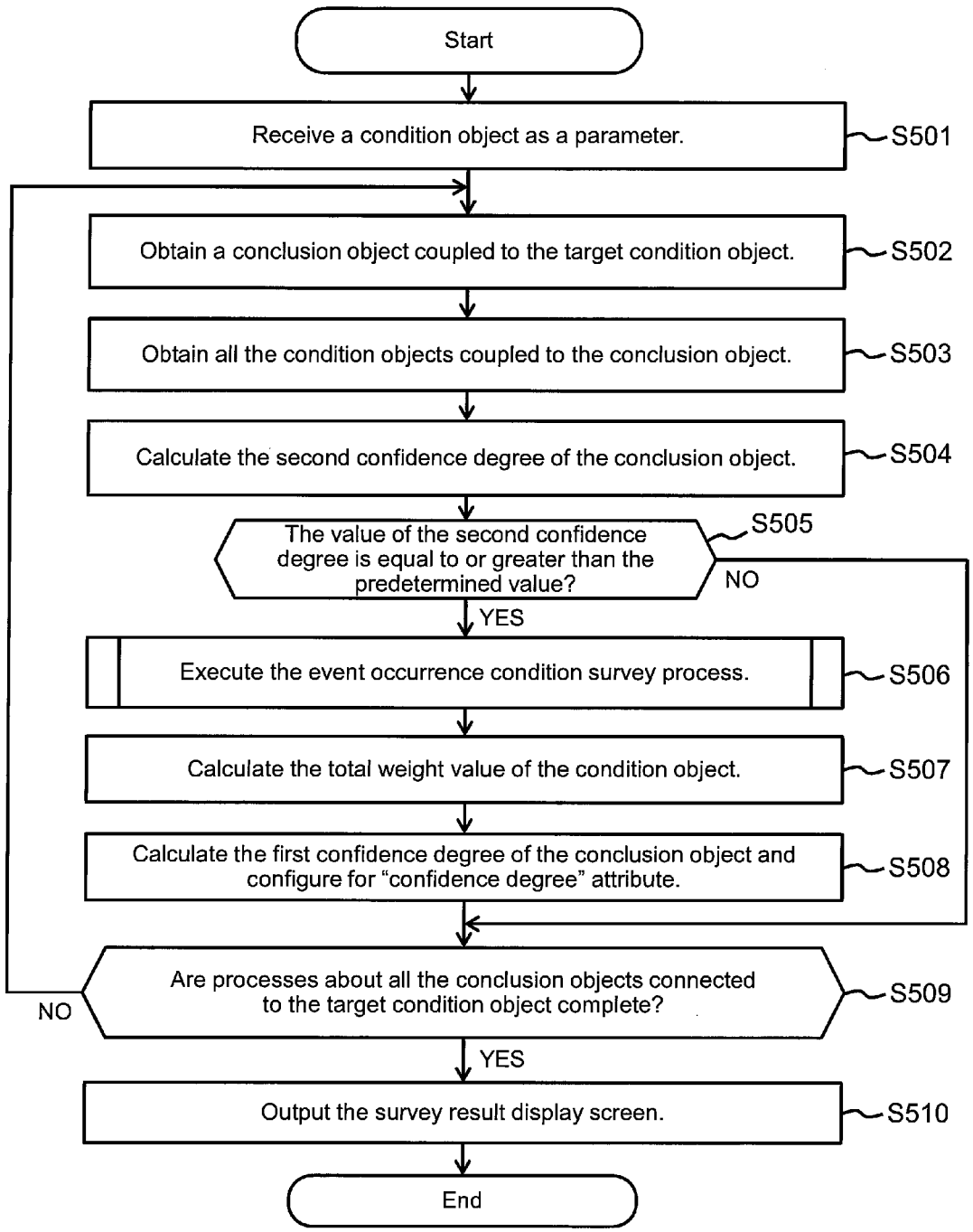
FIG. 13 is a flow chart of a confidence degree evaluation process according to the Embodiment 1.

FIG. 13 is a flow chart of a confidence degree evaluation process according to the Embodiment 1.

The confidence degree evaluation process is a process to calculate a confidence degree of the conclusion event on each conclusion object 82 coupled to input condition object 81 based on the rule memory data 8. The confidence degree evaluation process corresponds to step S309 process in the FIG. 11 or step S710 process in the FIG. 15.

First, the confidence degree evaluation program 125 receives the parameter input by the event writing program 123 or the event erase program 127 which activates the confidence degree evaluation process (step S501).

Then, the confidence degree evaluation program 125 obtains a conclusion object 82 (called "target conclusion object" in the description of the FIG. 13) coupled to the condition object 81 specified by the input parameter from the rule memory data 8 (step S502). In the description of the FIG. 13, a conclusion event corresponding to the target conclusion object is called as "target conclusion event".

Then, the confidence degree evaluation program 125 obtains all condition objects 81 coupled to the target conclusion object from the rule memory data 8 (step S503). In the description of the FIG. 13, each of the condition objects 81 coupled to the target conclusion object is called as "target condition object" and a condition event corresponding to the target condition object is called as "target condition event".

After that, the confidence degree evaluation program 125 calculates a confidence degree (the second confidence degree), which is a confidence degree on the target conclusion event, not considering the result of the detection possibility judgment on the target condition event (step S504). To be more specific, the confidence degree evaluation program 125 divides the number of target condition objects storing "Occurred" in the existence of occurrence 815, that is, the number of target condition objects corresponding to the condition event detected by the monitoring computer 1, by the total number of target condition objects and calculates the second confidence degree by multiplying 100 to the value obtained by dividing.

For example, in case of the rule memory data 8 indicated in the FIG. 7, the second confidence degree on a conclusion event corresponding to the second conclusion object 82 (hereafter, called "the second conclusion object") the second from the top, that is, the second confidence degree on a conclusion event of "Port 1 Link Down" regarding an IP switch 1 is calculated as follows. That is, the total number of condition objects 81 coupled to the second conclusion object is 4. In addition, among the condition objects 81 coupled to the second conclusion object, the only condition object whose existence of occurrence 815 stores "Occurred" is the first condition object and its number is 1. Therefore, the second confidence degree on the conclusion event corresponding to the second conclusion object is calculated as 25% (¼×100).

After that, the confidence degree evaluation program 125 judges whether the second confidence degree calculated in step S504 is equal to or greater than a predetermined value (for example, 20%) or not (step S505).

In case the second confidence degree is smaller than the predetermined value (step S505: NO), the confidence degree evaluation program 125 advances the process to step S509. That is, the confidence degree evaluation program 125 excludes a conclusion event having the second confidence degree smaller than the predetermined value from the candidates of cause and does not perform a process between step S506 and step S508. In this way, the confidence degree evaluation program 125 does not perform the event occurrence condition survey process and the calculation process of the first confidence degree (process between step S506 and step S508) on a condition event associated with the conclusion event whose possibility being a cause is very low and it can reduce a processing load by that.

On the other hand, in case the second confidence degree is equal to or greater than the predetermined value (step S505: YES), the confidence degree evaluation program 125 causes the event occurrence condition survey program 126 to execute an event occurrence condition survey process (see the FIG. 14) (step S506). Upon executing the event occurrence condition survey process, the confidence degree evaluation program 125 inputs a parameter specifying the target condition object whose existence of occurrence 815 does not store "Occurred", that is, the target condition object corresponding to the condition event which is not detected by the monitoring computer 1, to the event occurrence condition survey program 126. By this event occurrence condition survey process, the detection possibility judgment on an undetected target condition event is done and a weight value configuration of an undetected target condition event is done.

After that, the confidence degree evaluation program 125 calculates the total of the weight value (value of the weight value 816) configured to each of the target condition objects (step S507).

After that, the confidence degree evaluation program 125 calculates a confidence degree (the first confidence degree), which is a confidence degree on the target conclusion object, considering the result of the detection possibility judgment on the target condition event (step S508). To be more specific, the confidence degree evaluation program 125 divides the total of the weight value calculated in step S507, by the total number of target condition objects and calculates the first confidence degree by multiplying 100 to the value obtained by dividing.

For example, in case of the rule memory data 8 indicated in the FIG. 7, the first confidence degree on the second conclusion object is calculated as follows. That is, the total number of the condition objects 81 coupled to the second conclusion object is 4. In addition, the total of the weight value 816 of the condition object 81 coupled to the second conclusion object is 3. Therefore, the second confidence degree on the conclusion event corresponding to the second conclusion object is calculated as 75% (¾×100).

After that, the confidence degree evaluation program 125 stores the calculated first confidence degree in the confidence degree 824 of the target conclusion object.

After that, the confidence degree evaluation program 125 judges whether processes about all conclusion objects 82 coupled to the condition object specified by the input parameter or not (step S509). In case an unprocessed conclusion object 82 is left (step S509: NO), the confidence degree evaluation program 125 advances the process to step S502.

On the other hand, in case processes about all conclusion objects 82 coupled to the condition object specified by the input parameter is complete (step S509: YES), the confidence degree evaluation program 125 causes the display 17 to display the first survey result display screen (see the FIG. 16) for displaying the result of a cause analysis (step S510). After that, the confidence degree evaluation program 125 ends the confidence degree evaluation process.

Figure 14:
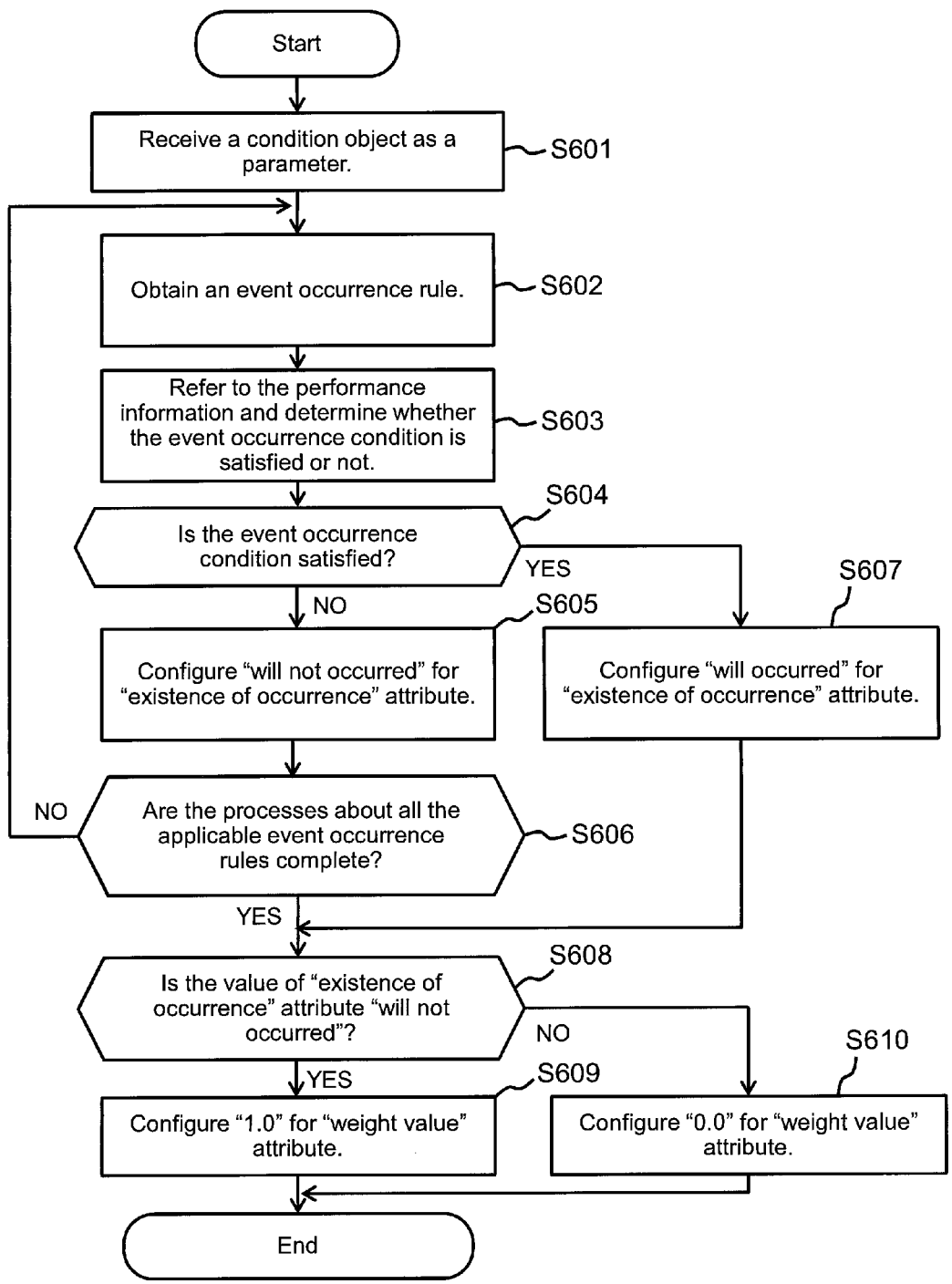
FIG. 14 is a flow chart of an event occurrence condition survey process according to the Embodiment 1.

FIG. 14 is a flow chart of an event occurrence condition survey process according to the Embodiment 1.

The event occurrence condition survey process is a process to perform the detection possibility judgment on a condition event (undetected condition event) corresponding to the input condition object 81 and configure the weight value to the condition event based on the judgment result. The event occurrence condition survey process corresponds to process of step S506 in the FIG. 13.

First, the event occurrence condition survey program 126 receives the parameter input by the confidence degree evaluation program which activates the event occurrence condition survey process (step S601). In the description of the FIG. 14, a condition object 81 specified by the input parameter is called as "target condition object" and a condition event corresponding to the target condition object is called as "target condition event". Further, the target condition event is an undetected event.

Then, the event occurrence condition survey program 126 obtains one event occurrence rule 1340 applied to the target condition event from the event occurrence rule repository 134 (step S602). To be more specific, the event occurrence condition survey program 126 obtains an event occurrence rule 1340 of which the node apparatus type and the event type indicated by the node type 1342 and the event type 1343 match the node apparatus type and the event type indicated by the node type 811 and the event 813 of the target condition object. For example, in case the target condition event is a "logical disc failure" event regarding VM B, an event occurrence rule 1340 whose node type 1342 stores a data indicating the server 2 ("Server"), which is the type of the node apparatus (VM B) related to the event, and whose event type 1343 stores a data indicating the type of the event, "logical disc failure", that is, in the example of the FIG. 6, an event occurrence rule 1340 whose number 1341 is "1" or an event occurrence rule 1340 whose number 1341 is "2", is obtained.

Then, the event occurrence condition survey program 126 refers to the performance value regarding the node apparatus related to the target condition event on the performance information table 133 and judges whether the monitoring computer 1 can detect the target condition event or not by judging whether an event occurrence condition regulated by the event occurrence rule 1340 obtained in step S602 is satisfied or not (step S603).

For example, in case the target condition event is a "logical disc failure" event regarding VM B and the event occurrence rule 1340 whose number 1341 on the FIG. 6 is "1" is obtained in step S602, the event occurrence condition survey program 126 judges as follows. That is, an event occurrence condition regulated by the event occurrence rule 1340 whose number 1342 is "1", is that the disc transfer average time regarding the disc drive becomes greater than 0 [msec] at least once in a period (target period) indicated by the survey period 1344b. Further, in this example, the target period is from 0 hour 0 minute 0 second April $7^{th}$ 2012 to present. On the performance information table 133 in the FIG. 5, there are three entries whose number 1331 are "7" to "9" indicating the performance value (disc transfer average time) regarding the disc drive of VM B in the target period and each of the performance values indicating is 80 [msec], 70 [msec] and 75 [msec]. That is, the performance value (disc transfer average time) regarding the disc drive of VM B in the target period has become greater than 0 at least once. Therefore, the event occurrence condition survey program 126 judges that the event occurrence condition is satisfied and that the monitoring computer 1 can detect the target condition event (the "logical disc failure" event regarding VM B).

Further, a period indicated by the survey period 1344b is for example, a period from a date and time which is a predetermined time earlier than the standard date and time (a date and time at which the detection possibility judgment is done) to the standard date and time. Here, the monitoring computer 1 determines a date and time which is a predetermined time earlier than the standard date and time (hereafter called "past standard date and time"), for example, as follows. That is, the monitoring computer 1 obtains a detection date and time of the conclusion event corresponding to the conclusion object 82 coupled to the target condition object. And, the monitoring computer 1 determines the latest start date and time of a performance information collection on the performance information reception program 124 out of a date and time before the obtained detection date and time of the conclusion event, as the past standard date and time. Further, in case the monitoring computer 1 does not detect a conclusion event corresponding to the conclusion object 82 coupled to the target condition object, it cannot obtain the detection date and time of the conclusion event. In this case, the monitoring computer 1 obtains the oldest date and time out of the detection date and time of each condition events of one or more condition objects 81 coupled to the conclusion object 82 coupled to the target condition object. And, the monitoring computer 1 determines the latest start date and time of a performance information collection on the performance information reception program 124 out of date and time before the obtained oldest detection date and time of the condition event, as the past standard date and time.

In case the event occurrence condition is satisfied (step S604: YES), the event occurrence condition survey program 126 stores "will occurred" indicating that the monitoring computer 1 can detect the target condition event in the existence of occurrence 815 of the target condition object 81 (step S607). After that, the event occurrence condition survey program 126 advances the process to step S608.

On the other hand, in case the event occurrence condition is not satisfied (step S604: NO), the event occurrence condition survey program 126 stores "will not occurred" indicating that the monitoring computer 1 cannot detect the target condition event in the existence of occurrence 815 of the target condition object 81 (step S605).

After that, the event occurrence condition survey program 126 judges whether processes about all of the event occurrence rules 1340 applied to the target condition event is complete or not (step S606). In case an event occurrence rule 1340 which has not been processed yet is left (step S606: NO), the event occurrence condition survey program 126 advances the process to step S602. On the other hand, in case processes about all of the event occurrence rules 1340 applied to the target condition event is complete (step S606: YES), the event occurrence condition survey program 126 advances the process to step S608.

On step S608, the event occurrence condition survey program 126 judges whether "will not occurred" is stored in the existence of occurrence 815 of the target condition object or not.

In case "will not occurred" is stored in the existence of occurrence 815 of the target condition object (step S608: YES), the event occurrence condition survey program 126 stores "1.0" in the weight value 816 of the target condition object (step S609). That is, in case the monitoring computer 1 cannot detect the target condition event, the target condition event is configured the same weight value "1.0" as the weight value configured in case the target condition event is detected. As a result, the monitoring computer 1 will be able to calculate the confidence degree by treating an undetected condition event judged as undetectable in step 508 of FIG. 13, as detected. After that, the event occurrence condition survey program 126 ends the event occurrence condition survey process.

On the other hand, in case "will not occurred" is not stored in the existence of occurrence 815 of the target condition object (step S608: NO), the event occurrence condition survey program 126 stores "0.0" in the weight value 816 of the target condition object (step S610). After that, the event occurrence condition survey program 126 ends the event occurrence condition survey process.

In this way, on the event occurrence condition survey process, for a target undetected condition event, the monitoring computer 1 performs the detection possibility judgment based on the performance value regarding the node apparatus related to the target condition event and the event occurrence rule 1340. And, in case the monitoring computer 1 judges that it can detect the target condition event, it configures the weight value "0.0" to the target condition event. And, in case the monitoring computer 1 judges that it cannot detect the target condition event, it configures the weight value "1.0" to the target condition event. The monitoring computer 1 will be able to calculate the confidence degree by treating an undetected condition event which has been judged as undetectable, as the one detected on the confidence degree evaluation process by configuring the weight value in this way. As a result, even when a condition event judged as undetectable exists, it is possible for the confidence degree on the conclusion event associated with the condition event to be calculated so it does not get too low.

Further, in this present embodiment, the monitoring computer 1 calculates the first confidence degree by treating an undetected condition event judged as undetectable, as the one detected. The monitoring computer may exclude an undetected condition event judged as undetectable from a target upon calculating the first confidence degree. That is, the monitoring computer 1 on S507 of the FIG. 13, calculates the total of the weight value by ignoring (not adding) the weight value configured to the undetected condition event judged as undetectable. And, the monitoring computer 1 on S508 of FIG. 13, calculates the total number of the target condition objects by ignoring (not counting) the condition object 81 corresponding to the undetected condition event judged as undetectable, and it may calculate the first confidence degree. Also by such a calculation method (a calculation method excluding an undetected condition event judged as undetectable from a target), a similar effect to a calculation method of the present embodiment, that is, an effect to be able to calculate the confidence degree on the conclusion event associated with the condition event so as it does not get too low even when a condition event judged as undetectable exists, can be obtained.

Figure 15:
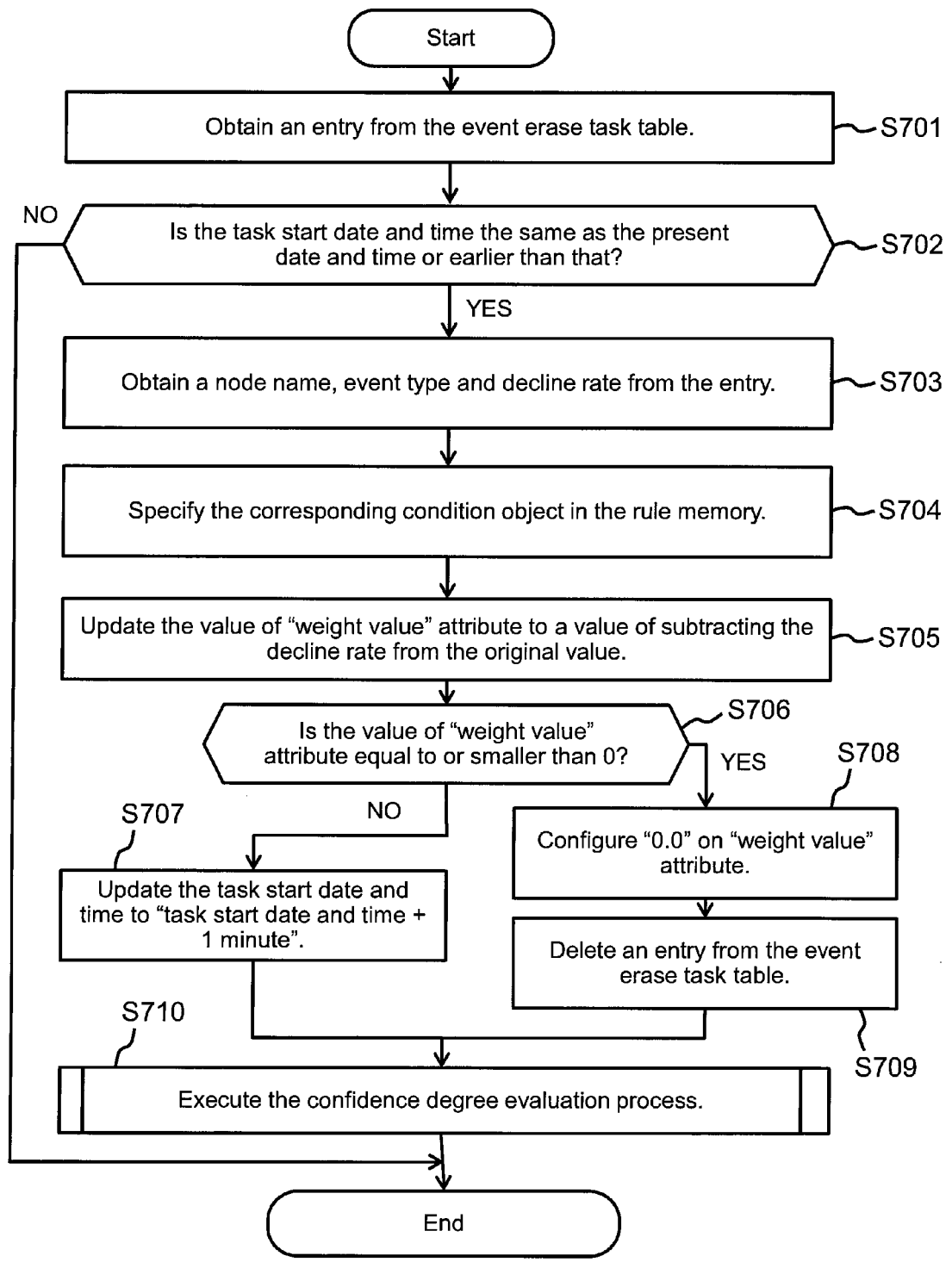
FIG. 15 is a flow chart of an event erase process according to the Embodiment 1.

FIG. 15 is a flow chart of an event erase process according to the Embodiment 1.

The event erase process is a process to decrease the weight value configured to the detected event based on the decline rate configured to the event.

First, the event erase program 127 obtains one entry from the event erase task table 136 (step S701). In the description of the FIG. 15, an obtained entry is called as "target entry" and an event erase task corresponding to the target entry, that is, an event erase task of which information is managed by the target entry is called as "target event erase task".

Then, the event erase program 127 judges if a date and time indicated by the task start date and time 1361 of the target entry, that is, the task start date and time of the target event erase task is the same as the present date and time or earlier than the present date and time (step S702). In case the task start date and time of the target event erase task is not the same as the present date and time and not earlier than the present date and time (step S702: NO), the event erase program 127 ends the event erase process.

On the other hand, in case the task start date and time of the target event erase task is the same as the present date and time or earlier than the present date and time (step S702: YES), the event erase program 127 obtains the name of the node apparatus related to the target event (called "target event" in the description of the FIG. 15) of the target event erase task, data indicating the type of the target event and the decline rate configured to the target event, from the node name 1362, the event type 1363 and the decline rate 1364 of the target entry (step S703).

Then, the event erase program 127 obtains a condition object 81 (called "target condition object" in the description of the FIG. 15) corresponding to the target event from the rule memory data 8 (step S704). To be more specific, the event erase program 127 searches for the rule memory data 8 using the name of the node apparatus related to the target event and the type of the target event obtained in step S703 as a key, and specifies a condition object 81 of which the node apparatus name and the event type indicated by the node name 812 and the event 813 match the key, as the target condition object.

Then, the event erase program 127 updates the value of the weight value 816 of the target condition object to a value of subtracting the decline rate configured to the target event from the original value (step S705). To be more specific, the event erase program 127 obtains a weight value (a weight value before the update) currently configured to the target event from the weight value 816 of the target condition object. And, the event erase program 127 stores, by way of overwriting, a value by subtracting the decline rate obtained in step 703 from obtained the weight value before the update, as a weight value after the update, to the weight value 816 of the target condition object.

After that, the event erase program 127 judges whether the value of the weight value 816 of the target condition object (the weight value after the update) is equal to or smaller than "0.0" or not (step S706).

In case the value of the weight value 816 of the target condition object is greater than "0.0" (step S706: NO), the event erase program 127 updates the task start date and time of the target event erase task to a date and time of one minute moved forward (step S707). To be more specific, the event erase program 127 obtains the task start date and time of the target event erase task (a task start date and time before the update) from the task start date and time 1361 of the target entry. And, the event erase program 127 stores, by way of overwriting, a date and time adding one minute to the obtained task start date and time before the update, as a task start date and time after the update to the task start date and time 1361 of the target entry. After that, the event erase program 127 advances the process to step S710.

On the other hand, in case the value of the weight value 816 of the target condition object is equal to or smaller than "0.0" (step S706: YES), the event erase program 127 stores "0.0" in the weight value 816 of the target condition object (step S708).

After that, the event erase program 127 deletes the target entry from the event erase task table 136 (step S709). After that, the event erase program 127 advances the process to step S710.

On step S710, the event erase program 127 causes the confidence degree evaluation program 125 to execute the confidence degree evaluation process (see the FIG. 13). Upon executing the confidence degree evaluation process, the event erase program 127 inputs a parameter specifying the target condition object to the confidence degree evaluation program 125. By this confidence degree evaluation process, a confidence degree on each conclusion event associated with the target event of which the weight value is updated, is recalculated. After that, the event erase program 127 ends an event erase process.

Figure 16:
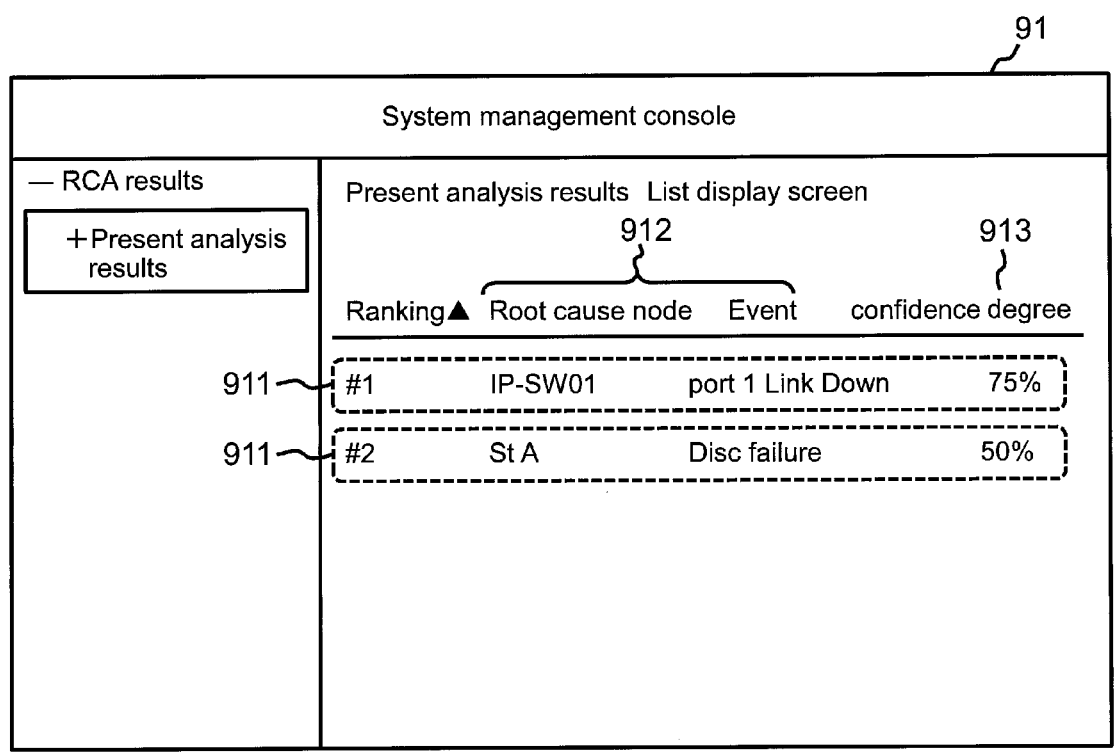
FIG. 16 is an example configuration of the first survey result display screen according to the Embodiment 1.

FIG. 16 is an example configuration of the first survey result display screen according to the Embodiment 1.

The first survey result display screen 91 is a screen displayed at step S510 of the FIG. 13 and a screen to notify cause analysis result to the administrator. In the first survey result display screen 91, an information element 911 regarding each of the conclusion events whose the first confidence degree is equal to or greater than a predetermined value (for example, 50%), that is, the conclusion events (hereafter, called "candidate conclusion event") judged as a possibility being a cause is high, is displayed. The information element 911 related to the candidate conclusion event includes for example, the information indicating the candidate conclusion event (a data indicating the name of the node apparatus related to the candidate conclusion event and the type of the candidate conclusion event) 912 and the first confidence degree 913 on the candidate conclusion event and the like. For example, the information element 911 regarding the candidate conclusion event is sorted by the value of the first confidence degree 913 on the candidate event and displayed.

On the first survey result display screen, when the administrator specifies one of the candidate conclusion events using the input device not shown, the monitoring computer 1 causes the display 17 to display the second survey result display screen (see the FIG. 17) to display the detailed information of a cause analysis regarding the specified candidate conclusion event.

Figure 17:
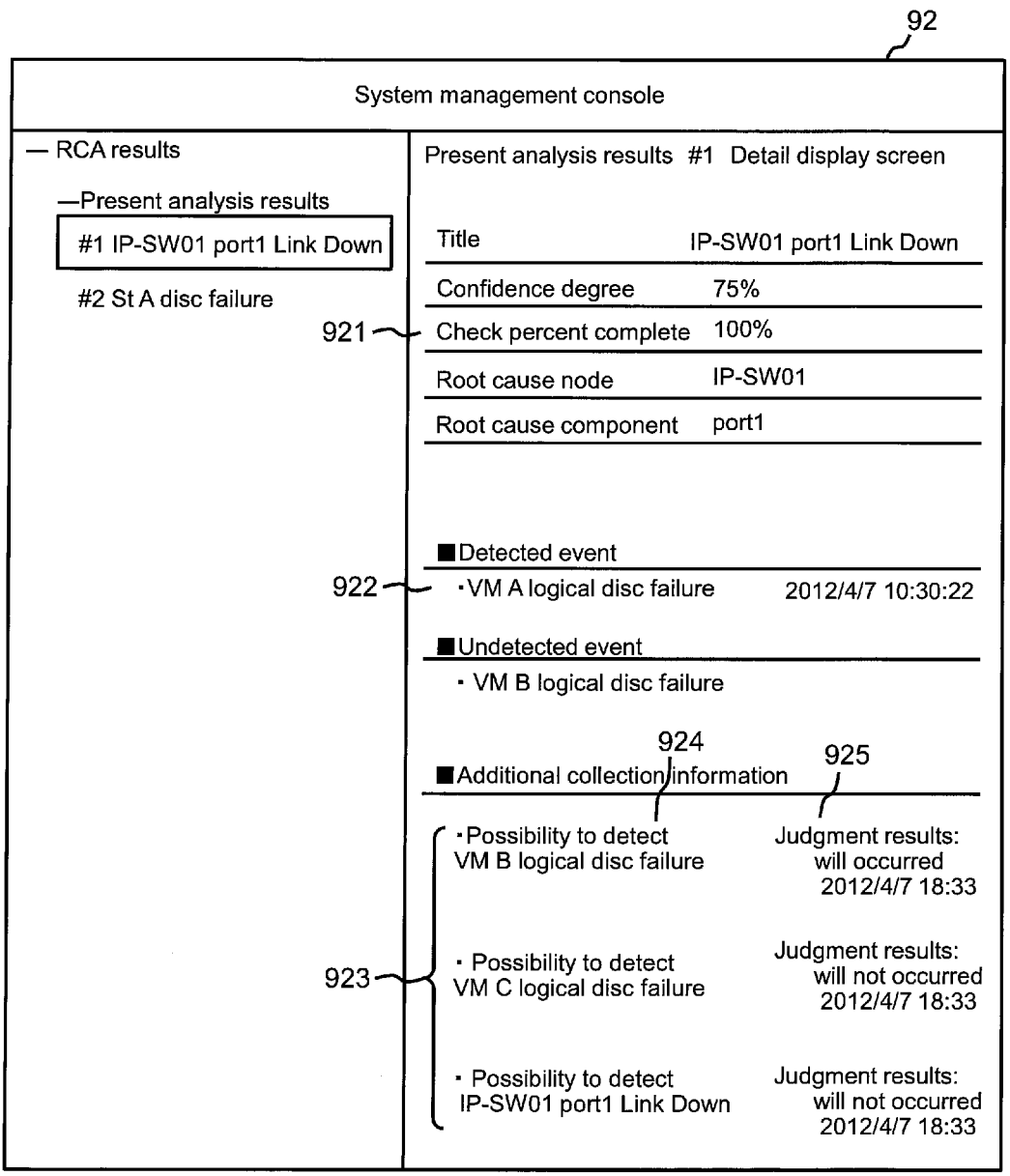
FIG. 17 is an example configuration of the second survey result display screen according to the Embodiment 1.

FIG. 17 is an example configuration of the second survey result display screen according to the Embodiment 1.

The second survey result display screen 92 is a screen to display the detailed information of a cause analysis regarding the specified candidate conclusion event on the first survey result display screen. In the second survey result display screen 92, as the detailed information of a cause analysis regarding the specified candidate conclusion event, for example, the information 922 indicating a detected condition event out of the condition events associated with the specified candidate conclusion event, the information 923 regarding an undetected condition event associated with the specified candidate conclusion event and a check progress degree 921 indicating a check progress degree of the detection possibility judgment done on the undetected condition event and the like, is displayed.

the information 923 regarding an undetected condition event associated with the specified candidate conclusion event includes, for example, the information 924 (a data indicating the name of the node apparatus regarding the undetected condition event and the type of the undetected condition event) indicating each undetected condition event and the result of the detection possibility judgment done on each undetected condition event, that is, the information 925 indicating whether the monitoring computer 1 can detect the condition event. In addition, the check progress degree 921, for example is a ratio of the number of undetected condition events on which the detection possibility judgment is done, to the number of undetected condition events associated with the specified candidate conclusion event.

By referring the first survey result display screen 91 and the second survey result display screen 92, the administrator can find one or more candidate conclusion events of which the first confidence degree is equal to or greater than a predetermined value and estimate which candidate conclusion event is the cause. In the present embodiment, a confidence degree which becomes a judgment standard of whether or not being the candidate conclusion event, and a confidence degree to be notified to the administrator on the first survey result display screen and the second survey result display screen 92, are the first confidence degree, that is, a confidence degree calculated not to be too low even when a condition event which cannot be detected by the monitoring computer 1 exists. In this way, by performing a judgment of whether or not being the candidate conclusion event done by a monitoring computer 1 and a cause estimate done by the administrator based on the first confidence degree, a risk that the conclusion event which should be the original cause is overlooked by the monitoring computer or the administrator because of that an undetectable condition event exists and the confidence degree becomes too low, can be reduced.

In addition, in case the conclusion event is included in one or more condition events associated with the conclusion event, that is, in a case that the conclusion event is also a condition event, in case a condition event being the conclusion event as well is detected, the administrator can specify the detected event (a conclusion event being a condition event as well) as a cause without referring to the confidence degree. That is, it can be said that an estimate of cause based on the confidence degree is an effective method in either case that a condition event being a conclusion event as well is not detected or cannot be detected. On the other hand, in case a condition event which cannot be detected by the monitoring computer 1 exists, there is a problem that the calculated confidence degree becomes too low. In the present embodiment, especially in case the confidence degree is emphasized, that is, in either case that a condition event being a conclusion event as well is not detected or cannot be detected, a reliable confidence degree can be calculated.

[Embodiment 2]

The embodiment 2 is an embodiment in case an event is an event (hereafter, called "performance event") regarding a performance failure of the monitoring target apparatus. The computer system configuration according to the embodiment 2 is practically the same as the computer system configuration according to the embodiment 1 except for the following. That is, the monitoring computer 1 according to the embodiment 2 stores a performance information monitoring program 129 in the memory 12 and stores a performance event definition table 137 in the disc 13. The monitoring computer 1 configuration according to the embodiment 2 which differs from that of the embodiment 1 is described as follows.

FIG. 18 is an example configuration of the performance event definition table according to the Embodiment 2.

The performance event definition table 137 is a data defining the performance event possible to occur in the computer system. The performance event definition table 137 includes fields of a number 1371, a node name 1372, a component name 1373, a threshold 1374, a metric 1375, a basal value 1376, a condition 1377 and an event type 1378. In the number 1371, the number of the performance event is stored. In the node name 1372, the name of the node apparatus related to the performance event is stored. In the component name 1373, the name of the component related to the performance event is stored. In the threshold 1374, a standard value (hereafter, called "performance threshold") upon judging an existence of occurrence of the performance event is stored. In the metric 1375, data indicating the type of the performance value corresponding to the performance event is stored. In the basal value 1376, a value (hereafter, called "basal value") used upon calculating the weight value configured to the performance event being a condition event is stored. In the condition 1377, data indicating a condition (hereafter, called "performance event condition") to be judged as the performance event has occurred, is stored. In the event type 1378, data indicating the type of the performance event is stored.

For example, it is understood that a performance event which is "abnormal increase of the memory usage rate" event regarding the memory 22 of VM B occurs in case the memory 22 usage rate of VM B is greater than 50% from an entry whose number 1371 in the FIG. is "1". In addition, it is understood that for example, a performance event which is "decrease of disc transfer process efficiency" event regarding the disc drive of VM C occurs in case the disc transfer average time of the disc drive of VM C is greater than 100 [msec] from an entry whose number 137 in the FIG. is "4".

FIG. 19 is an example configuration of the event occurrence rule repository according to the Embodiment 2.

The field configuration of the event occurrence rule repository 134 according to the embodiment 2 is practically the same as the field configuration of the event occurrence rule repository 134 according to the embodiment 1. One or more event occurrence rules 1340 applied for the performance event is stored in the event occurrence rule repository 134 according to the embodiment 2.

For example, an entry whose number 1341 in the FIG. is "1" indicates an event occurrence rule 1340 on a performance event of "decrease of disc transfer process efficiency" regarding the server 2. An event occurrence condition defined by this event occurrence rule 1340 is that the disc transfer average time regarding the disc drive becomes greater than 0 [msec] at least once in the period indicated by the survey period 1344b. That is, this event occurrence rule 1340 represents that, in a case where the disc transfer average time regarding the disc drive of the server 2 becomes greater than 0 [msec] at least once in the period indicated by the survey period 1344b on the performance event of "decrease of disc transfer process efficiency" regarding the server 2, the monitoring computer 1 determines that it can detect this event.

In addition, for example, an entry whose number 1341 in the FIG. is "2", indicates an event occurrence rule 1340 on a performance event of "high load of the port" regarding an IP switch. And, an event occurrence condition defined by this event occurrence rule 1340 is that the port receiving speed becomes greater than 0 [MB/sec] at least once in the period indicated by the survey period 1344b. That is, this event occurrence rule 1340 represents that, in a case where the port receiving speed of the IP switch becomes greater than 0 [MB/sec] at least once in the period indicated by the survey period 1344b on the performance event of "high load of the port" regarding the IP switch, the monitoring computer 1 determines that it can detect this event.

In addition, for example, an entry whose number 1341 in the FIG. is "3", indicates an event occurrence rule 1340 on a performance event of "performance degradation of the disc" regarding the storage 3. And, an event occurrence condition defined by this event occurrence rule 1340 is that an I/O response time regarding the LU becomes greater than 0 [msec] at least once in the period indicated by the survey period 1344b. That is, this event occurrence rule 1340 represents that, in a case where the I/O response time regarding the LU of the storage 3 becomes greater than 0 [msec] at least once in the period indicated by the survey period 1344b on the performance event of "performance degradation of the disc" regarding the storage 3, the monitoring computer 1 determines that it can detect this event.

Figure 20:
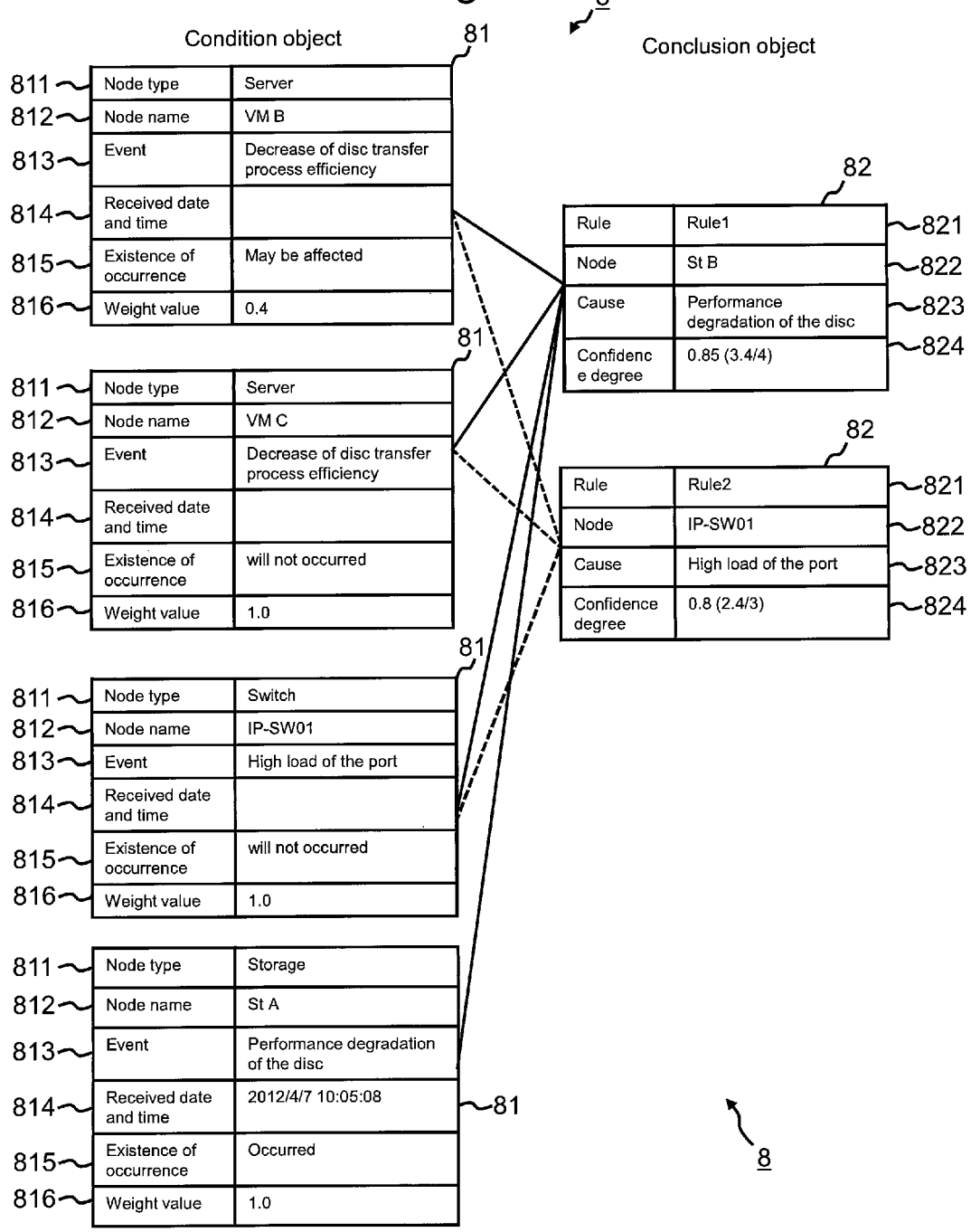
FIG. 20 is an example configuration of a rule memory data according to the Embodiment 2.

FIG. 20 is an example configuration of the rule memory data according to the Embodiment 2.

The field configuration of each condition object 81 and each conclusion object 82 of the rule memory data 8 according to the embodiment 2 is practically the same as the field configuration of each condition object 81 and each conclusion object 82 of the rule memory data 8 according to the embodiment 1.

In the present embodiment 2, in case the detection possibility judgment on the condition event corresponding to the condition object 81 is performed and judgment result showing that the monitoring computer 1 can detect the event is obtained, in the existence of occurrence of the condition object 81, data indicating that the condition event is a performance event and the monitoring computer 1 can detect the performance event, for example "May be affected" is stored. Other cases, that is, in case the condition event is detected, in case the condition event is not detected and the detection possibility judgment is not done yet, and in case the detection possibility judgment on the condition event is performed and the judgment result showing that the monitoring computer 1 cannot detect the event is obtained, a similar data as the embodiment 1 is stored.

A different point from the embodiment 1 on an operation of the monitoring computer 1 according to the embodiment 2 is described as follows.

Figure 21:
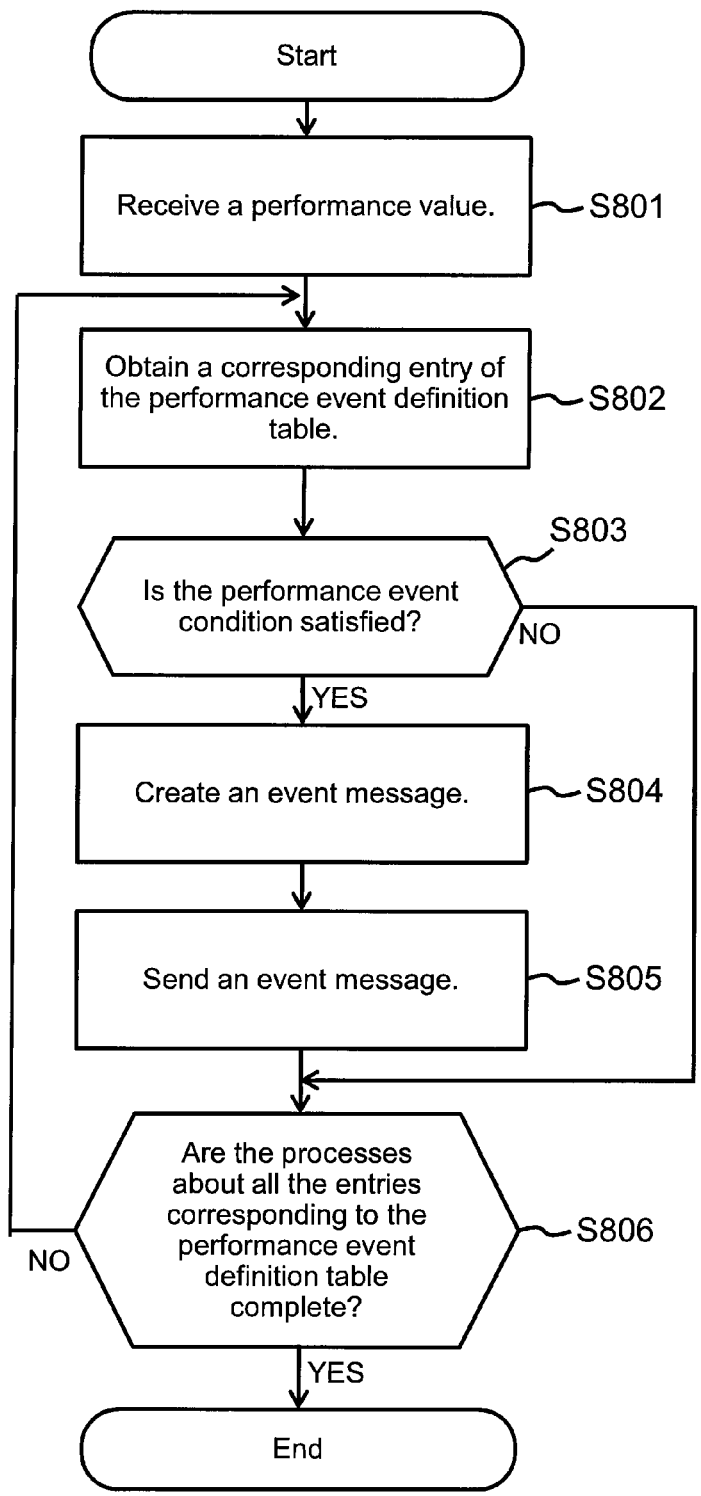
FIG. 21 is a flow chart of a performance information monitoring process according to the Embodiment 2.

FIG. 21 is a flow chart of a performance information monitoring process according to the Embodiment 2.

The performance information monitoring process is a process to judge whether the performance event is occurring or not on the monitoring target apparatus based on the received performance value regarding the monitoring target apparatus. In case it is determined that the performance event is occurring, a creation and sending of a corresponding event message 7 will be done.

First, the performance information monitoring program 129 receives the performance value regarding the monitoring target apparatus (step S801). For example, the performance information monitoring program 129 may send a performance value obtaining request to the monitoring target apparatus periodically or randomly, and cause the monitoring target apparatus to send the performance value.

Then, the performance information monitoring program 129 obtains an entry corresponding to the performance value received at step S801 from the performance event definition table 137 (step S802). To be more specific, the performance information monitoring program 129 obtains an entry of which the node apparatus name indicated by the node name 1371 matches the name of the node apparatus related to the performance value received at step S801 and of which the performance value type indicated by the metric 1375 matches the type of the performance value received at step S801. For example, in case the performance value received at step S801 is the memory usage rate regarding VM B, an entry whose number 1371 in the example of the FIG. 18 is "1", is obtained.

After that, the performance information monitoring program 129 judges whether the performance value obtained at step S801 satisfies a performance event condition indicated by the condition 1377 of the entry obtained at step S802 or not (step S803). In case the performance event condition is not satisfied (step S803: NO), the performance information monitoring program 129 advances the process to step S806.

On the other hand, in case the performance event condition is satisfied (step S803: YES), the performance information monitoring program 129 creates an event message 7 indicating that a performance event indicated by the entry obtained at S802 has occurred (step S804). For example, in case the performance value received at step S801 is the memory usage rate regarding VM B and the performance event condition indicated by the condition 1377 of the entry whose number 1371 in the FIG. 18 is "1" is satisfied, an event message 7 whose node type 71 stores a data indicating the type of the server 2, and whose node name 72 stores the name of VM B, and whose event type 73 stores a data indicated by the event type 1378 of the entry whose number 1371 is "1", that is, "abnormal increase of the memory usage rate", is created.

After that, the performance information monitoring program 129 sends the event message 7 created at step S804 to the event reception process program 122 (step S805). The event reception process program 122 receiving the event message 7 indicating a performance event occurrence starts the event reception process described at the embodiment 1. After that, the performance information monitoring program 129 advances the process to step S806.

On step S806, the performance information monitoring program 129 judges whether processes about all entries corresponding to the performance value received at step S801 on the performance event definition table 137 are complete or not. In case an entry which has not been processed yet is left (step S806: NO), the performance information monitoring program 129 advances the process to step S802. On the other hand, in case processes about all entries corresponding to the performance value received at S801 on the performance event definition table 137 are complete (step S806: YES), the performance information monitoring program 129 ends the performance information monitoring process.

Figure 22:
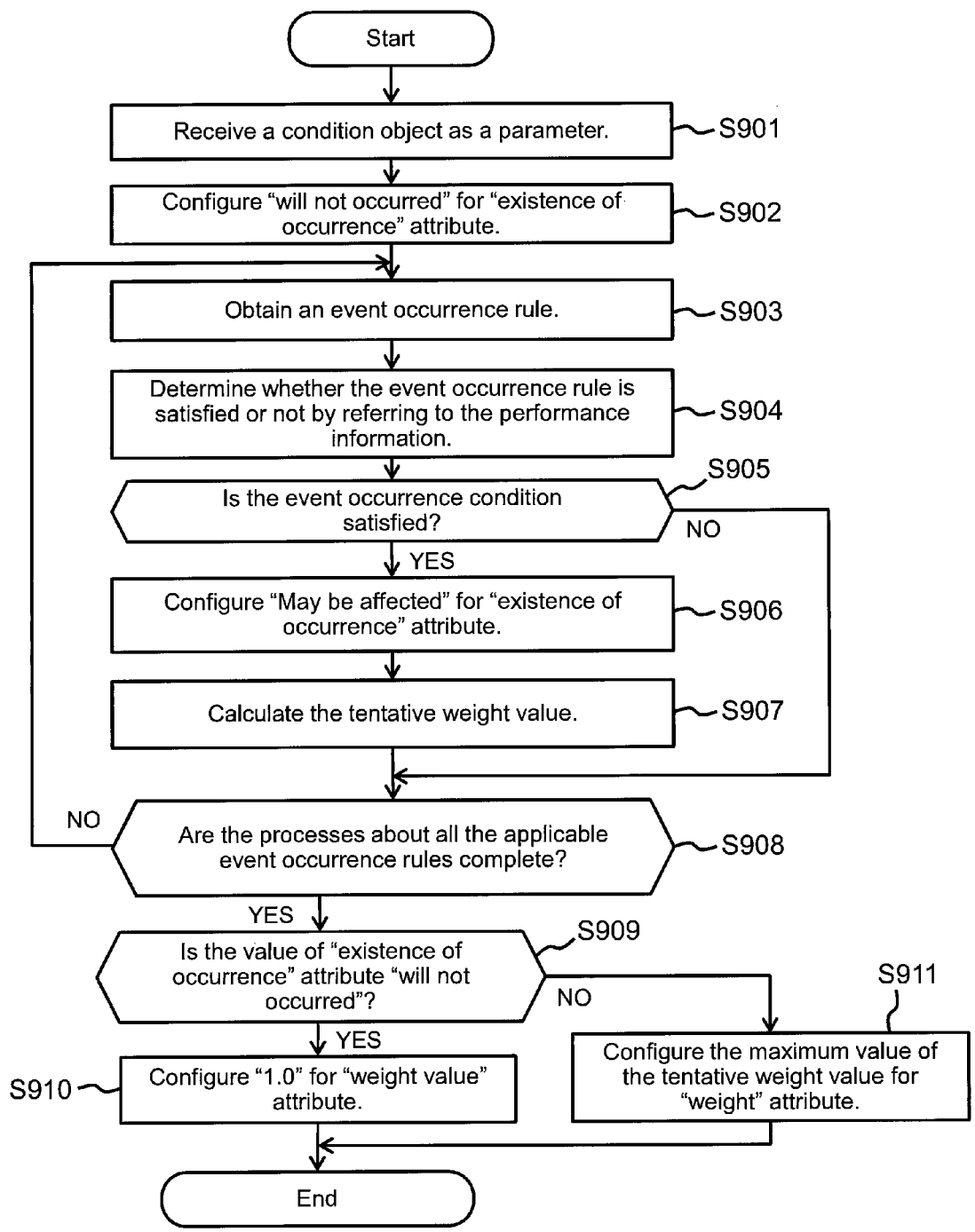
FIG. 22 is a flow chart of an event occurrence condition survey process according to the Embodiment 2.

FIG. 22 is a flowchart of an event occurrence condition survey process according to the Embodiment 2.

First, the event occurrence condition survey program 126 receives a parameter input by the confidence degree evaluation program 125 (step S901). In the description of the FIG. 22, a condition object specified by an input parameter is called as "target condition event" and a condition event corresponding to the target condition object is called as "target condition event". In addition, the target condition event is an undetected performance event.

Then, the event occurrence condition survey program 126 stores "will not occurred" indicating that the monitoring computer 1 cannot detect the target condition event, in the existence of occurrence 815 of the target condition object (step S902).

Then, the event occurrence condition survey program 126 obtains one event occurrence rule 1340 applied for the target condition event from the event occurrence rule repository 134 (step S903). For example, in case the target condition event is a performance event of "decrease of disc transfer process efficiency" regarding VM B, an event occurrence rule 1340 whose node type 1342 stores a data indicating the server 2 ("Server"), which is the type of the node apparatus (VM B) related to the performance event, and whose event type 1343 stores a data indicating "decrease of disc transfer process efficiency" which is the type of the performance event, that is, an event occurrence rule 1340 whose number 1341 is "1" in the example of the FIG. 19, is obtained.

Then, the event occurrence condition survey program 126 refers to the performance value regarding the node apparatus related to the target condition event on the performance information table 133, and judges whether the monitoring computer 1 can detect the target condition event or not by judging whether an event occurrence condition defined by the event occurrence rule 1340 obtained at step S903 is satisfied or not (step S904).

For example, in case the target condition event is a performance event of "decrease of disc transfer process efficiency" regarding VM B, and the event occurrence rule 1340 whose number 1341 is "1" in the FIG. 19 is obtained in step S903, the event occurrence condition survey program 126 judges as follows. That is, an event occurrence condition defined by the event occurrence rule 1340 whose number 1341 is "1" is that the disc transfer average time regarding the disc drive becomes greater than 0 [msec] at least once in the target period. In addition, in this example, the target period is from 0 hour 0 minute 0 second April 7$^{th}$ 2012 to present. On the performance information table 133 in the FIG. 5, there are three entries whose ID 1331 are "7" to "9" indicating the performance value (disc transfer average time) regarding the disc drive of VM B in the target period, and the performance values indicated by those are 80 [msec], 70 [msec] and 75 [msec] respectively. That is, the performance value (disc transfer average time) regarding the disc drive of VM B in the target period has become greater than 0 at least once. Therefore, the event occurrence condition survey program 126 judges that the event occurrence condition is satisfied and that the monitoring computer 1 can detect the target condition event (the performance event of "decrease of disc transfer process efficiency" regarding VM B).

In case the event occurrence condition is not satisfied (step S905: NO), the event occurrence condition survey program 126 advances the process to step S908.

On the other hand, in case the event occurrence condition is satisfied (step S905: YES), the event occurrence condition survey program 126 stores "May be affected" indicating that the target condition event is a performance event and the monitoring computer 1 can detect the target condition event, in the existence of occurrence 815 of the target object (step S906).

After that, the event occurrence condition survey program 126 calculates a value (hereafter, called "tentative weight value") being a candidate for a weight value configured to the target condition event (step S907).

An event occurrence condition survey program 126, for example, calculates the tentative weight value as follows. That is, first, the event occurrence condition survey program 126 obtains one or more performance values which correspond to the target condition event and which are collected in the target period of the event occurrence rule 1340 obtained at step S903, from the performance information table 133. Here, a performance value corresponding to the target condition event is a performance value whose type matches the type of the performance value indicated by the metric 1375 of the entry defining the target condition event on the performance event definition table 137. And, the event occurrence condition survey program 126 calculates, for each of obtained performance values, an absolute value (hereafter, called "the first difference value") of a value of subtracting the basal value, that is, the value of the basal value 1376 of the entry defining the target condition event on the performance event definition table 137, from the performance value. In addition the event occurrence condition survey program 126 calculates an absolute value (hereafter, called "the second difference value") of a value of subtracting the basal value of the target condition event from the performance threshold of the target condition event, that is, the value of the threshold 1374 of the entry defining the target condition event on the performance event definition table 137. The event occurrence condition survey program 126 sets a value which has been obtained by dividing the maximum value of the first difference value calculated for each of performance values by the second difference value, as tentative weight value. Here, the first difference value is a difference between the collected performance value and the basal value, and the second difference value is a difference between the performance threshold and the basal value. That is, as for the tentative weight value, the closer the collected performance value is to the performance threshold, the closer the value is to "1.0", and on a contrary, the farther the collected performance value is from the performance threshold, the closer the value is to "0.0".

For example, in case the target condition event is a performance event of "decrease of disc transfer process efficiency" regarding VM B, and the target period of the event occurrence rule 1340 obtained at step S903 is from 0 hour 0 minute 0 second April 7th 2012 to present, the event occurrence condition survey program 126 calculates the tentative weight value as follows. That is, on the performance information table 133 in the FIG. 5, the entry indicating a performance value (disc transfer average time) which corresponds to the target condition event and which is collected in the target period is each of three entries whose numbers 1331 are "7" to "9", and the performance values indicated by those are 80 [msec], 70 [msec] and 75 [msec] respectively. In addition, on the performance event definition table 137 in the FIG. 18, the entry defining the target condition event is an entry whose number 1371 is "2", and its basal value is 0, and its performance threshold is 200. Therefore, the event occurrence condition survey program 126 sets a value obtained by dividing 80(|80−0|) which is the maximum value of the first difference value by 200 (|200−0|) which is the second difference value, that is, 0.4 as tentative weight value. After that, the event occurrence condition survey program 126 advances the process to S908.

On step S908, the event occurrence condition survey program 126 judges whether processes about all of the event occurrence rules 1340 applied for the target condition event are complete or not In case an event occurrence rule 1340 which has not been processed yet is left (step S908: NO), the event occurrence condition survey program 126 advances the process to step S903.

On the other hand, in case processes about all of the event occurrence rules 1340 applied for the target condition event are complete (step S908: YES), the event occurrence condition survey program 126 judges whether "will not occurred" is stored in the existence of occurrence 815 of the target condition object or not (step S909).

In case "will not occurred" is stored in the existence of occurrence 815 of the target condition object (step S909: YES), the event occurrence condition survey program 126 stores "1.0" in the weight value 816 of the target condition object (step S910). That is, in case the monitoring computer 1 cannot detect the target condition event, the same weight value "1.0" as the weight value configured in case the target condition event is detected, is configured to the target condition event. As a result, the monitoring computer 1 on step S508 in the FIG. 13 will be able to calculate the confidence degree by treating an undetected condition event judged as undetectable, as detected. After that, the event occurrence condition survey program 126 ends the event occurrence condition survey process.

On the other hand, in case "will not occurred" is not stored in the existence of occurrence 815 of the target condition object, that is, incase "May be affected" is stored (step S909: NO), the event occurrence condition survey program 126 stores the maximum value of the tentative weight value calculated at step S907 in the weight value 816 of the target condition object (step S911). After that, the event occurrence condition survey program 126 ends the event occurrence condition survey process.

In this way, on the event occurrence condition survey process according to the embodiment 2, in case the monitoring computer 1 judges that it can detect a target condition event, it does not configure the weight value "0.0" to the target condition event but stores the maximum value of the tentative weight value calculated at step S907. In addition, as for the tentative weight value, the closer the collected performance value is to the performance threshold, the closer the value becomes to "1.0", and the farther the collected performance value is from the performance threshold, the closer the value becomes to "0.0". By configuring the weight value in this way, the monitoring computer 1, for an undetected condition event judged as detectable, will be able to calculate the confidence degree considering the magnitude of difference between the collected performance value corresponding to the condition event in the period, and the performance threshold of the condition event in addition to whether the condition event is detected or not on the confidence degree evaluation process. That is, the monitoring computer 1 does not calculate the confidence degree by treating condition events which do not satisfy the performance event condition, as not detected in the same way, but it will be able to calculate the confidence degree in order to have a different value depending on the magnitude of difference between the collected performance value and the performance threshold, to be more specific, as the closer the collected performance value is to the performance threshold, the confidence degree becomes higher and the farther the collected performance value is from the performance threshold, the confidence degree becomes lower.

Further, the present invention is not limited to the embodiment described above, and various changes can be made without departing from the scope of the present invention.

[Reference Signs List]
1 Monitoring computer
2 Server
3 Storage
4 Network apparatus
5 Communication network

The invention claimed is:

1. A monitoring system configured to perform a cause analysis of an event which occurs in any of a plurality of node apparatuses, comprising:
 a storage device; and
 a control device coupled to the storage device,
 wherein the storage device is configured to store a plurality of rules indicating a correspondence relationship between one or more condition events regarding any of the plurality of node apparatuses, and a conclusion as to a cause of the one or more condition events in a case where the one or more condition events have occurred,
 wherein the control device is configured to:
 (A) detect one or more condition events out of a plurality of condition events included in the plurality of rules;
 (B) specify a first conclusion associated with the one or more detected condition events based on one or more rules of the plurality of rules;
 (C) perform a detection possibility judgment as to whether the monitoring system can detect the condition event or not, for each of one or more condition events out of the plurality of condition events included in the plurality of rules; and
 (D) calculate a first index value indicating a certainty of the first conclusion being the cause, based on an existence of detection of one or more condition events associated with the first conclusion and a result of the detection possibility judgment.

2. A monitoring system according to claim 1, wherein the control device is configured to:
 perform the detection possibility judgment for an undetected condition event out of one or more condition events associated with the first conclusion according to (C).

3. A monitoring system according to claim 2, wherein the control device is configured to:
 display content of the first conclusion, the first index value of the first conclusion and the result of the detection possibility judgment.

4. A monitoring system according to claim 3, wherein the control device is configured to:
calculate a second index value, without considering the result of the detection possibility judgment, indicating the certainty of the first conclusion to be the cause, based on the existence of detection of one or more condition events associated with the first conclusion; and
perform (C) and (D) in case the second index value is equal to or greater than a predetermined value.

5. A monitoring system according to claim 4, wherein the control device is configured to:
obtain a performance value regarding each of the plurality of node apparatuses regularly or irregularly, and store the obtained performance value in the storage device with information indicating the date and time at which the performance value is obtained; and
perform the detection possibility judgment based on the performance value obtained in a predetermined first period in accordance with (C).

6. A monitoring system according to claim 5, wherein the performance value is a performance value facilitating judgment as to whether a target node apparatus has performed a data communication with other node apparatus or not,
wherein the control device is configured to:
judge, for a first condition event to be a target of the detection possibility judgment, whether a node apparatus related to the first condition event has performed a data communication with other node apparatus in the first period or not based on a performance value regarding a node apparatus related to the first condition event according to (C),
judge that the first condition event is detectable in case the judgment result showing that a data communication has been performed is obtained, and
judge that the first condition event is undetectable in case the judgment result showing that a data communication has not been performed is obtained.

7. A monitoring system according to claim 6, wherein the condition event is an event regarding a performance failure of any of the plurality of node apparatuses,
wherein the storage device is configured to further store event definition information indicating a performance threshold to be a standard upon judging an existence of occurrence of the condition event for each of one or more condition events regarding any of the plurality of node apparatuses,
wherein the control device is configured to calculate the first index value based on, for each of the condition events judged as detectable based on the detection possibility judgment, a magnitude of difference between a performance value regarding a node apparatus related to the condition event and the performance threshold regarding the condition event in addition to the existence of detection of one or more condition events associated with the first conclusion and the result of the detection possibility judgment according to (D).

8. A non-transitory computer readable medium containing a monitoring program for causing a computer comprising a monitoring system to perform a cause analysis of an event which occurs in any of a plurality of node apparatuses,
wherein the monitoring program is configured to cause the computer to execute:
(A) detecting one or more condition events out of a plurality of condition events included in a plurality of rules indicating a correspondence relationship between one or more condition events regarding any of the plurality of node apparatuses, and a conclusion as to a cause of the one or more condition events in a case where the condition events have occurred;
(B) specifying a first conclusion associated with the detected condition event based on one or more rules out of the plurality of rules;
(C) performing a detection possibility judgment as to whether the monitoring system can detect the condition event or not, for each of one or more condition events out of the plurality of condition events included in the plurality of rules; and
(D) calculating a first index value indicating a certainty of the first conclusion being the cause, based on an existence of detection of one or more condition events associated with the first conclusion and a result of the detection possibility judgment.

9. A non-transitory computer readable medium according to claim 8, wherein the monitoring program is configured to cause the computer to execute:
performing the detection possibility judgment for an undetected condition event out of one or more condition events associated with the first conclusion according to (C).

10. A non-transitory computer readable medium according to claim 9, wherein the monitoring program is configured to cause the computer to execute:
calculating a second index value, without considering the result of the detection possibility judgment, indicating the certainty of the first conclusion to be the cause, based on the existence of detection of one or more condition events associated with the first conclusion; and
performing (C) and (D) in case the second index value is equal to or greater than a predetermined value.

11. A non-transitory computer readable medium according to claim 8, wherein the monitoring program is configured to cause the computer to execute:
obtaining a performance value regarding each of the plurality of node apparatuses regularly or irregularly, and storing the obtained performance value in the storage device with information indicating the date and time at which the performance value is obtained; and
performing the detection possibility judgment based on the performance value obtained in a predetermined first period according to (C).

12. A non-transitory computer readable medium according to claim 11, wherein the performance value is a performance value facilitating judgment as to whether a target node apparatus has performed a data communication with other node apparatus or not,
wherein the monitoring program is configured to cause the computer to execute:
judging, for a first condition event to be a target of the detection possibility judgment, whether a node apparatus related to the first condition event has performed a data communication with other node apparatus in the first period or not based on a performance value regarding a node apparatus related to the first condition event on the above (C),
judging that the first condition event is detectable in case the judgment result showing that a data communication has been performed is obtained, and
judging that the first condition event is undetectable in case the result showing that a data communication has not been performed is obtained.

13. A non-transitory computer readable medium according to claim 8, wherein the monitoring program is configured to cause the computer to execute:

displaying content of the first conclusion, the first index value of the first conclusion and the result of the detection possibility judgment.

14. A non-transitory computer readable medium according to claim 8, wherein the monitoring program is configured to cause the computer to execute:
  obtaining a performance value regarding each of the plurality of node apparatuses; and
  performing the detection possibility judgment based on the obtained performance value according to (C).

15. A non-transitory computer readable medium according to claim 8, wherein the condition event is an event regarding a performance failure of any of the plurality of node apparatuses,
  wherein the monitoring program is configured to cause the computer to execute:
    calculating the first index value based on, for each of the condition events judged as detectable on the detection possibility judgment, a magnitude of difference between a performance value regarding a node apparatus related to the condition event and the performance threshold, the performance threshold being a standard upon judging an existence of occurrence of the condition event, regarding the condition event in addition to the existence of detection of one or more condition events associated with the first conclusion and the result of the detection possibility judgment according to (D).

* * * * *